(12) United States Patent
Debevec

(10) Patent No.: US 12,098,819 B2
(45) Date of Patent: Sep. 24, 2024

(54) STAGE LIGHTING ASSEMBLY WITH PERFORATED LAYER

(71) Applicant: NETFLIX, INC., Los Gatos, CA (US)

(72) Inventor: Paul E. Debevec, Culver City, CA (US)

(73) Assignee: Netflix, Inc., Los Gatos, CA (US)

( * ) Notice: Subject to any disclaimer, the term of this patent is extended or adjusted under 35 U.S.C. 154(b) by 0 days.

(21) Appl. No.: 17/991,795

(22) Filed: Nov. 21, 2022

(65) Prior Publication Data
US 2024/0167668 A1    May 23, 2024

(51) Int. Cl.
| | |
|---|---|
| *F21V 11/14* | (2006.01) |
| *F21V 3/04* | (2018.01) |
| *F21V 13/02* | (2006.01) |
| *F21W 131/406* | (2006.01) |
| *H04N 23/56* | (2023.01) |
| *H04N 23/74* | (2023.01) |

(52) U.S. Cl.
CPC ............. *F21V 11/14* (2013.01); *F21V 3/049* (2013.01); *F21V 13/02* (2013.01); *F21W 2131/406* (2013.01); *H04N 23/56* (2023.01); *H04N 23/74* (2023.01)

(58) Field of Classification Search
CPC ..................... F21V 11/08; F21V 11/14; F21W 2131/406; H05B 47/105; H05B 47/155; H04N 23/56; H04N 23/90
See application file for complete search history.

(56) References Cited

U.S. PATENT DOCUMENTS

| | | | |
|---|---|---|---|
| 5,299,012 A * | 3/1994 | Tsuruta ................... | H04N 23/56 348/370 |
| 10,006,607 B1 * | 6/2018 | Brockett ................. | A01G 9/249 |
| 2013/0114267 A1 * | 5/2013 | Ho ......................... | F21S 43/145 362/306 |
| 2014/0160720 A1 * | 6/2014 | Seuntiens .............. | G02B 6/005 362/2 |
| 2017/0082259 A1 * | 3/2017 | Riethmüller ............. | F21V 1/12 |

(Continued)

FOREIGN PATENT DOCUMENTS

| | | | | |
|---|---|---|---|---|
| DE | 102010032190 A1 * | 6/2012 | ............... | B60Q 1/26 |
| DE | 102019133754 A1 * | 6/2020 | .............. | F21V 14/02 |

(Continued)

*Primary Examiner* — Alexander K Garlen
(74) *Attorney, Agent, or Firm* — Greenberg Traurig, LLP

(57) ABSTRACT

The systems herein include a support structure and multiple light sources mounted to the support structure. The light sources are configured to project light onto a recording stage to light a specified video scene that is to be recorded on the recording stage. These systems also include a perforated layer that includes an arrangement of apertures. The perforated layer has an inward face directed toward the lighting sources and an outward face directed toward the recording stage. The inward face of the perforated layer includes a surface layer that is more reflective than the surface layer of the outward face of the perforated layer. These systems also include a controller that modifies the light emission profile of the light sources, including changing color balance, brightness, time dependence, and/or spatial variation over the light emissive surface of the light sources. Various other apparatuses and recording stage devices are also disclosed.

20 Claims, 11 Drawing Sheets

(56) References Cited

U.S. PATENT DOCUMENTS

| | | | |
|---|---|---|---|
| 2018/0176521 A1* | 6/2018 | Laduke | H05B 45/20 |
| 2019/0032891 A1* | 1/2019 | Dijken | F21V 11/14 |
| 2020/0187335 A1* | 6/2020 | Jordan | H05B 47/155 |

FOREIGN PATENT DOCUMENTS

| | | | | | |
|---|---|---|---|---|---|
| EP | | 3890305 A1 | * | 10/2021 | G06K 7/10722 |
| GB | | 2500566 A | * | 10/2013 | G06F 3/04883 |
| WO | WO-2004008742 A2 | * | 1/2004 | H04N 23/56 |
| WO | WO-2007096559 A1 | * | 8/2007 | B60Q 1/2607 |

* cited by examiner

STAGE LIGHTING ASSEMBLY WITH PERFORATED LAYER

BACKGROUND

Modern movies are often filmed on recording stages. These recording stages typically use large panels of light emitting diode (LED) panels to create life-size backdrops that are capable of projecting customizable images. These LED panels are also often used to illuminate the actors' faces and bodies. In such cases, the LED panels are typically placed above and to the sides of the recording stage to cast light on the actors' bodies. These LED panels, however, fail to project large portions of the color spectrum and, as such, may project inaccurate lighting on the actors that is often noticeable to viewers. Moreover, these specialized LED panels are highly expensive and can greatly increase costs in a film production budget.

SUMMARY

As will be described in greater detail below, the present disclosure describes improved recording stage lighting assemblies that are both cheaper and provide more accurate lighting. In one example, a system is provided. The system includes a support structure and multiple light sources mounted to the support structure. The light sources are configured to project light onto a recording stage to light a specified video scene that is to be recorded on the recording stage. The system further includes a perforated layer that includes an arrangement of apertures. The perforated layer has an inward face directed toward the lighting sources and an outward face directed toward the recording stage. The inward face of the perforated layer includes a surface layer that is more reflective than a surface layer of the outward face of the perforated layer.

In some examples, the system further includes a diffusing layer positioned between the light sources and the perforated layer. In some cases, the diffusing layer reflects at least a portion of projected light that is reflected from the inward face of the perforated layer. In some cases, an inner reflectance of the inward face of the perforated layer is at least 70% for at least one wavelength of the projected light, and an outer reflectance of the outward face of the perforated layer is less than 20% for the at least one wavelength of projected light. In some embodiments, the outer reflectance is less than 10% for the wavelength of projected light. In some cases, the inner reflectance is greater than 85% for the wavelength of projected light.

In some examples, the perforated layer includes a polymer layer supporting an inner metal coating. The inner metal coating provides an inner reflectance of the inward face of the perforated layer. In some cases, the arrangement of apertures includes a uniform grid of apertures. In other cases, the arrangement of apertures includes a randomly spaced arrangement of apertures. In some cases, the light sources include an array of controllable light-emitting diodes (LEDs). In some embodiments, the array of controllable LEDs has a center-to-center spacing of at least 10 mm between LEDs along at least one direction.

In some cases, the system further includes a controller configured to: receive background image data and adjust a light emission profile of at least one light source of the light sources based on the background image data. In some embodiments, the controller is configured to adjust a color balance of the light source of the light sources based on the background image data. In some examples, the controller is configured to adjust a brightness of the light source of the light sources based on the background image data.

In some embodiments, an apparatus is provided that includes a support structure and multiple light sources mounted to the support structure. The light sources are configured to project light onto a recording stage to light a specified video scene that is to be recorded on the recording stage. The apparatus also includes a perforated layer that has an arrangement of apertures. The perforated layer has an inward face directed toward the lighting sources and an outward face directed toward the recording stage. The inward face of the perforated layer includes a surface layer that is more reflective than a surface layer of the outward face of the perforated layer.

In some examples, the apertures in the arrangement of apertures account for 15% or less of the surface area of the perforated layer. In some cases, the surface layer of the inward face of the perforated layer has a mirror finish. In some cases, the apparatus further includes a diffusing layer positioned between the light sources and the perforated layer, and a controller configured to modify a light emission profile of at least one light source of the light sources. In some embodiments, modifying the light emission profile of at least one light source of the light sources includes modifying the color, brightness, color balance, or time dependence of the projected light.

In some embodiments, a recording stage lighting device includes a support structure and multiple light sources mounted to the support structure. The light sources are configured to project light onto a recording stage to light a specified video scene that is to be recorded on the recording stage. The apparatus further includes a perforated layer including an arrangement of apertures. The perforated layer has an inward face directed toward the lighting sources and an outward face directed toward the recording stage. The inward face of the perforated layer includes a surface layer that is more reflective than the surface layer of the outward face of the perforated layer.

Features from any of the embodiments described herein are usable in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
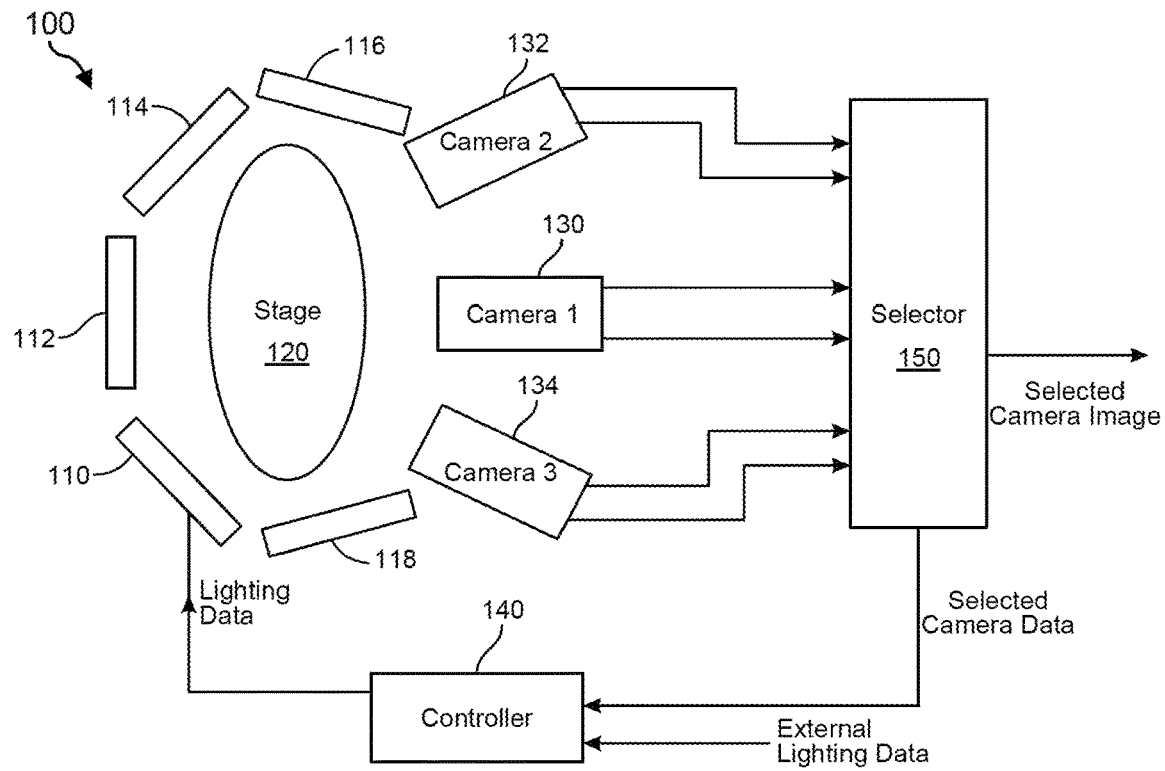
FIG. 1 illustrates an embodiment of a lighting assembly and cameras arranged around a stage environment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION

The present disclosure is generally directed to improved recording stage lighting assemblies. As noted above, traditional recording stage lighting systems use LED panels to provide a large, programmable backdrop. These LED panels have very high resolution and are individually programmable. In contrast to conventional television and computer monitor displays, the LED panels in recording stages have no borders and can thus be arranged side-by-side to create a contiguous surface of virtually any size. These LED panels thus form a changeable, programmable background for the recording stage that is capable of reproducing virtually any image desired by a film or television director. That director may then record many different video scenes on a single recording stage.

In such traditional recording stages, LED panels are often installed above and to the sides of the recording stage. These LED panels are intended to illuminate the actors' faces and bodies in a manner similar to that of the image rendered in the LED panel background. The spectrum of light that comes out of these LED panels, however, tends to have poor color rendering. Such LED panels are designed for showing many different saturated colors that work well for a background display, but function poorly for illuminating actors. For example, the light emitted by such LED panels fails to reproduce large portions of the visible light spectrum. These missing portions of the visible light spectrum are necessary for accurate color rendition when illuminating actors.

Still further, LED light sources can, in many cases, cause reflections on objects that are shiny, such as the actors' eyes or a mirrored surface. In some cases, diffusion material is placed between the LED panels and the actors on the recording stage. Adding this diffusion layer, however, can introduce new problems. For instance, diffusion material is reflective. If a director were attempting to illuminate only the left side of the recording stage and were shining lights directly on the left side, some of the light would reflect off of diffusion material on the right side of the stage. As such, the right side would be illuminated more than is desired by the light reflected off of the right-side diffusion layer. This resulting decreased contrast ratio is highly limiting when trying to capture a video scene with a tightly controlled lighting scheme.

In contrast to these prior attempts, the embodiments described herein provide systems and methods for illuminating specific sections of a recording stage while avoiding the illumination of other sections. These systems provide such illumination at $1/10^{th}$ of the cost of traditional LED panels. The systems described herein are designed to illuminate a recording stage using an array of light sources that is much lower in resolution and, thus, much cheaper. The light sources may be LEDs, light bulbs, or other light sources, and may include different colors such as red, green, blue, white, or other selectable (tunable) colors.

Light from the array of light sources travels through a perforated layer before reaching the recording stage. The perforated layer has multiple apertures or holes arranged in a pattern. The perforated layer has an inward face directed toward the lighting sources and an outward face directed toward the recording stage. The inward face of the perforated layer includes a surface that is more reflective than the surface of the outward face. The more reflective, inward face of the perforated layer causes at least some of the light emitted by the light sources to internally reflect, recycle, and gain intensity. The less reflective, outward face of the perforated layer causes external light emitted by other light sources on the sound stage to be absorbed (i.e., to have a very low albedo). This ensures that each light source will only illuminate its intended portion of the recording stage. The less reflective, outward face of the perforated layer ensures a high contrast ratio over each part of the recording stage.

One exemplary lighting assembly (or "recording stage lighting device" herein) includes a support structure and multiple light sources mounted to the support structure. The various light sources are configured to project light onto a recording stage to illuminate a specified video scene that is to be recorded on the recording stage. The recording stage lighting device also includes a perforated layer that has an arrangement of apertures. The perforated layer has an inward face directed toward the lighting sources and an outward face directed toward the recording stage. The inward face of the perforated layer includes a surface layer that is more reflective than the surface layer of the outward face of the perforated layer. In some cases, the light sources are directed through a diffuser (or "diffusion layer" herein) to provide a light source that appears to be continuous without attempting to reproduce high-definition source images.

An alternative exemplary lighting assembly includes a set of light-emitting diodes (LEDs), a diffuser, and a perforated film having apertures through which light passes. The perforated film has a dark surface on the side facing the stage that reduces reflections (e.g., compared to using a diffuser alone). The perforated film also has a light-colored or reflective surface on the side facing the LED assembly that directs light that does not pass through the apertures back towards the LED assembly. This light is subsequently reflected or scattered back through an aperture, thereby increasing the efficiency of the lighting system. In addition to providing increased efficiency, the systems described herein enable better illumination of a stage environment, improve image capture, provide a color balance that is more closely aligned with the intended background of the stage environment, and/or provide a number of other features and advantages.

Figure 2:
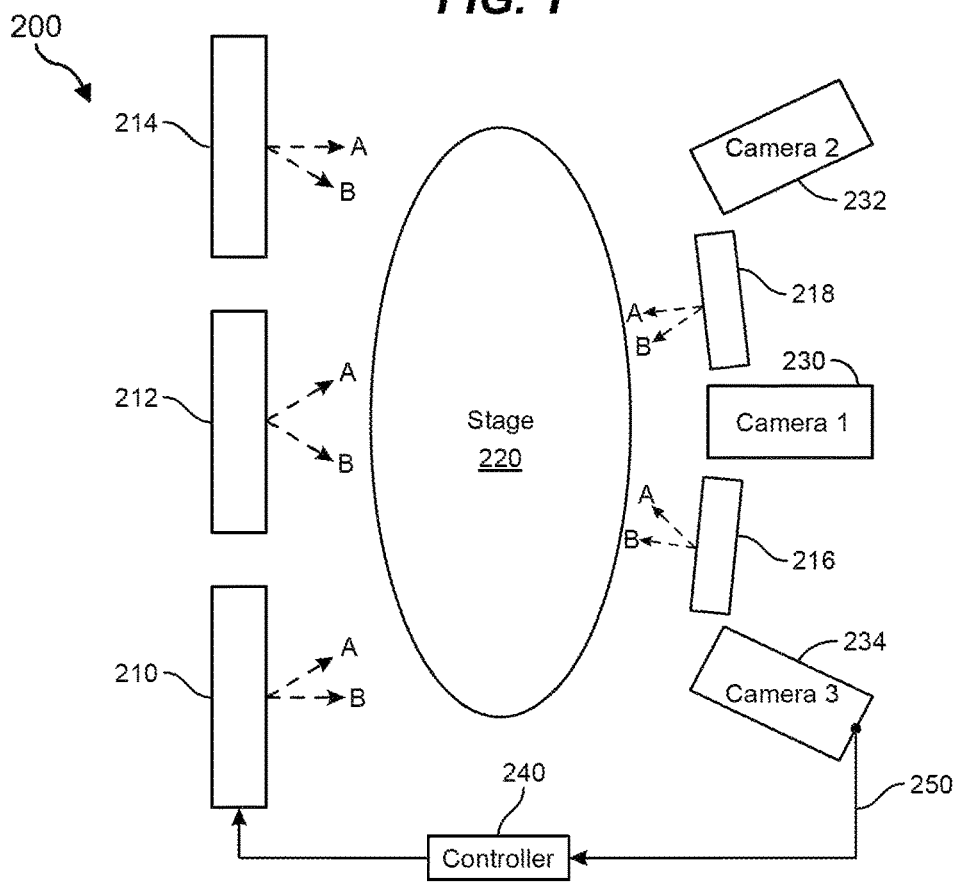
FIG. 2 illustrates an embodiment of a lighting assembly that is configured to illuminate a stage environment associated with multiple cameras.
Figure 3:
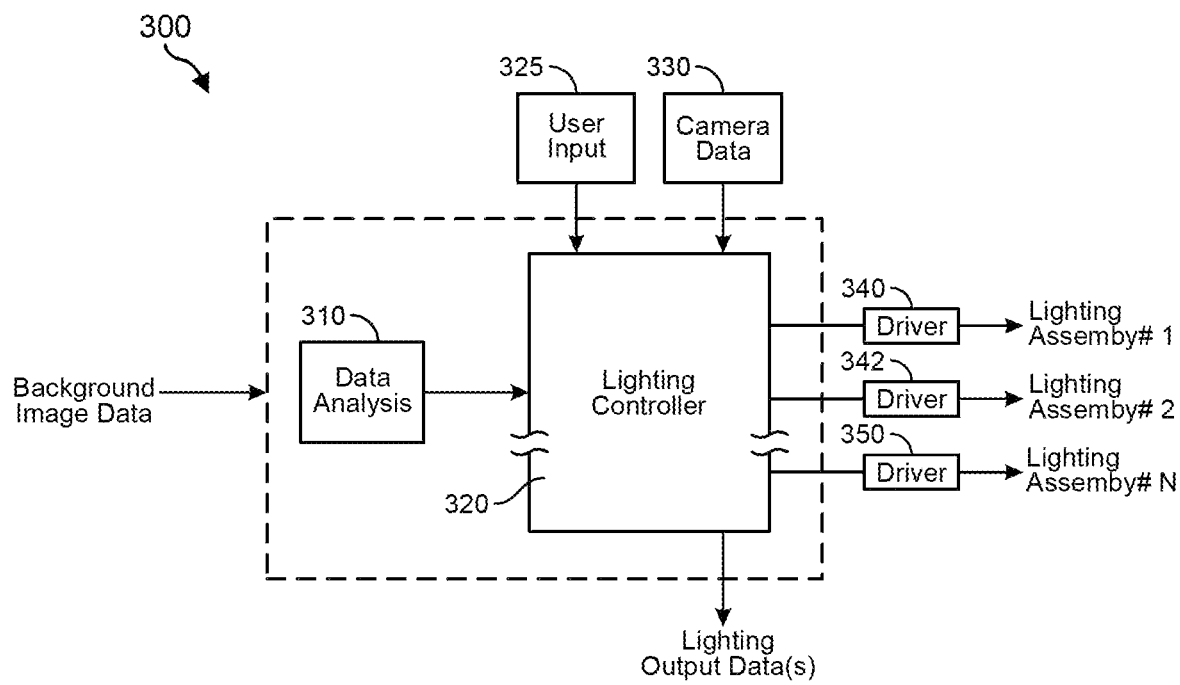
FIG. 3 illustrates a controller that is configured to receive background image data and to provide lighting data to a lighting assembly.

The following will provide, with respect to FIGS. 1-3, exemplary lighting assemblies and controllers within a stage environment. The discussion corresponding to FIGS. 4-7 covers various arrangements of light sources within lighting assemblies, and the discussion corresponding to FIGS. 8, 9, and 14A-15B provides an overview of exemplary perforated films and diffusion layers. Furthermore, FIGS. 10-13 show exemplary prototypes of lighting units, and FIG. 16 shows an exemplary enclosure of a light source.

FIG. 1 shows alighting assembly 100 and cameras arranged around a recording stage environment. As shown, the lighting assembly 100 includes lighting units 110, 112, 114, 116, and 118. Each of the individual lighting units may be positioned behind the stage 120, to the sides of the stage, in front of the stage, or above the stage. Each lighting unit includes one or more light sources. Three cameras 130, 132, and 134 are shown having different camera locations and different camera directions and arranged around a stage 120. Camera location and camera direction are determined relative to one or more of the lighting units of the lighting assembly or relative to any relatively fixed component within the stage environment. In the illustrated example, camera #3 (134) is selected, and camera data including camera location data are optionally selected by selector 150 and provided to the controller 140.

In some examples, as discussed in greater detail in connection with FIG. 3 below, the controller receives lighting data (e.g., external lighting data from an external source), which is based on a background image that may be added by any appropriate method (e.g., green screen, video editing, or a display wall). Furthermore, at least in some cases, the controller addresses the color balance and reflections from within the stage environment to be appropriate for the background image, thereby improving the appearance of the stage environment.

At least in some cases, the controller is configured to receive the lighting data and provide background image data and profile adjustment data to each of the lighting units of the lighting assembly. For illustrative convenience, only a connection to lighting unit 110 is shown. The light emission from lighting unit 110 is directed towards the camera providing the location data. If the camera selected is changed (or if the camera is moved to a different location), the change in location data results in a change in profile adjustment data sent to the lighting units of the lighting assembly.

In some examples, only one camera is operational at any particular time, and the light emission profile of the lighting assembly is configured for the position of the operational camera. In some cases, the selector 150 receives camera image and location data from each camera, selects one camera as the operational camera, outputs camera data from the selected camera, and provides location data to the controller for the selected camera. In some examples, only the selected camera is turned on. Furthermore, in some cases, only one camera is operational at any particular time, and the light emission profile of the lighting assembly is configured for the position of the operational camera.

FIG. 2 shows a lighting assembly 200 having a generally linear or planar arrangement configured to illuminate a stage environment (e.g., a recording stage) associated with a plurality of cameras. Lighting assembly 200 includes portions 210, 212, 214, 216, and 218, each of which includes one or more lighting panels. As with the lighting panels shown in FIG. 1, the lighting panels of lighting assembly 200 may be positioned behind the stage 220, to the sides of the stage, in front of the stage, or above the stage. Three cameras 230, 232, and 234 are shown as having different camera locations and directions and arranged around a stage 220. Camera location and camera direction are determined relative to one or more of the portions of the lighting assembly or relative to any relatively fixed component within the stage environment. In the illustrated example, camera #3 (234) is selected, and optionally camera data 250 including camera location data is provided to the controller 240. The controller is configured to receive any camera data and background image data and provide profile adjustment data to one or more of the portions of the lighting assembly. For illustrative convenience, only connections to portion 210 are shown. In some examples, only one camera is operational at any particular time, and the light emission profile of the lighting assembly is configured for the position of the operational camera.

In some cases, the light emission from portion 210 is directed towards the appropriate camera location using profile adjustment data provided by the controller. In this example, if camera #3 is in use, the beam directions from the portions are shown by dashed arrows labeled "B". If the camera selected is changed to camera 2 (or if the camera 3 is moved to a location corresponding to illustrated camera 2), the change in location data results in a change in profile adjustment data sent to the portions of the lighting assembly (each of which includes one or more lighting panels). The beam direction is adjusted to that of the dashed arrow labeled "A". The beam direction is modified by reorienting or otherwise adjusting the angular distribution of emitted light from one or more panels or panel portions.

In some examples, the brightness of different portions of the lighting assembly is adjusted as the camera moves relative to the lighting assembly. The camera is directed towards a recording stage so that at least a portion of a lighting assembly is configured to direct light towards objects (e.g., actors and/or inanimate objects) within a field of view of the camera. The image from the camera is modified to remove the lighting assembly and any other background objects and to insert the desired background image in the video scene being filmed.

The recording stage environments shown in FIGS. 1 and 2 represent production environments in which real-life actors and physical objects are located. Such recording stage environments are usable in any suitable indoor or outdoor location, and are able to replicate any lighting situation needed for filming. In some cases, a lighting assembly surrounds or is otherwise located by the recording stage on one or more sides, and in some examples, surrounds the recording stage. At least in some cases, the lighting assembly has a generally circular shape, though other shapes are also usable, such as arcuate shapes that are not complete circles, parabolic shapes, planar shapes, polygons, or other suitable shapes. In some cases, lighting panels are curved, or the circular shape is approximated by a polygon formed of generally flat lighting panels or lighting assembly portions. In some cases, one or more cameras are located within the lighting assembly. Using the location and direction of the camera, and/or using the portion of the background image captured by the camera, a lighting assembly controller adjusts the brightness of a portion of the lighting assembly to increase the image brightness at the camera.

Example lighting assembly configurations include a wall, arc, curved surface, irregular surface, cylinder, cuboid or partial cuboid (e.g., include one or more of walls, ceiling, and/or floor), cylinder (e.g., a circular arrangement of lighting elements), dome, floor, ceiling, or other arrangement. Arrangements include one or more planar sections, angled portions, polygonal or curved portions, continuous or non-continuous arrangements around the stage environment. In some examples, the overall light emissive area of a lighting assembly is less than 10 square meters, unlike traditional video wall configurations. In some examples, a lighting assembly includes a plurality of lighting panels, where each lighting panel has a diagonal dimension of at least 8 inches.

In some approaches, a video wall is used to provide both a background image and background-appropriate lighting using the displayed background image. However, a video wall is typically very expensive, consumes large amounts of power, and is difficult to move or reconfigure. In some examples, instead of using a video wall for lighting and/or to display a background image, the lighting systems disclosed herein are used. In such embodiments, portions of the lighting assembly that mostly illuminate stage regions outside the field of view of the camera are deactivated or dimmed. Additionally or alternatively, a video wall is combined with a lighting assembly, where the video wall provides a background image and the lighting assembly provides additional lighting for the stage environment. Most of the power consumption of the combination is consumed by the lighting assembly. As the lighting assembly alone provides sufficient illumination for the stage environment, the power consumption of any video wall used in conjunction with a lighting assembly is greatly reduced, and the background image displayed on the video wall is of greatly reduced brightness compared to approaches that do not use a lighting assembly as described herein.

In some examples, an additional lighting element is used in conjunction with the lighting assemblies disclosed herein. Such additional lighting elements include a spotlight, such as an LED spotlight having an adjustable color. The additional lighting element includes one or more optical elements, such as a lens (e.g., an adjustable lens) that is used to effectively position the additional lighting element at an appropriate distance from the stage. For example, parallel light beams are obtained from an additional light source representing the sun, simulating a light source effectively located at infinity.

In some examples, a lighting assembly is supported by, positioned on, or extends from at least a part of a wall, window, floor, and/or ceiling of a stage environment. In some cases, a lighting assembly used as a ceiling portion or otherwise raised above the stage floor provides light having lighting parameters corresponding to a sky (e.g., a blue, gray, red, or other color sky), clouds, lightning, other atmospheric phenomena, or any other appropriate image. Light emission profiles from at least a portion of the lighting assembly (such as relatively brighter portions, position over the stage or orientation, etc.) are adjusted to increase the image brightness for a particular camera. In some cases, a lighting assembly used as a floor portion provides light having lighting parameters corresponding to foliage, lava, water features (e.g., a lake, pool or ocean) construction, and the like.

In some examples, a lighting assembly is used with or includes a video wall configured to display a background image. In some embodiments, the background image includes various desired representations, such as mountains, other outdoor scenery, or buildings (exteriors or interiors). A camera is used to record video images from the stage, including at least a portion of the background image. The stage then appears to be located within an environment shown by the background image. For example, in some cases, the background image includes an outdoors environment such as mountains or woodland, and the stage then appears to be part of the outdoors environment. In some cases, the background image is computer-generated, based on previously obtained images or videos, or is a combination of both real images and computer-generated images. Such video data include time dependent aspects such as waving of foliage, glinting reflections from water features (e.g., from waves on the surface of water), dynamic processes such as sunsets and sunrises, rain effects, and the like.

FIG. 3 shows a controller 300 configured to receive background image data and to provide lighting data to a lighting assembly, which improves the realism of stage lighting, reduces power consumption typically used for lighting, and/or allows for efficient and effective reconfiguration of lighting for a scene. In some examples, controller 300 uses the background image data to determine how to modify a light emission profile for a lighting assembly. As shown in FIG. 3 the controller 300 includes a video signal capture circuit 310, a driver controller 320, one or more drivers shown at 340, 342, and 350. In some cases, the controller 300 receives signals from the user input 325 and the camera sensor 330. The video signal capture circuit 310 receives a video signal representing the image to be displayed on the lighting assembly and sends corresponding image data to the driver controller. The driver controller 320 sends video signals to each of one or more drivers, which in turn sends signals to each of the lighting panels. Each driver is associated with one or more lighting panels.

In some cases, the controller 300 receives signals from user input 325, such as one or more user input devices associated with a computer that are used to provide the controller circuit function. The controller 300 also receives signals from camera sensor 330, which includes one or more of a camera position sensor, a camera direction sensor, or a camera output (such as camera settings or image level settings corresponding to the image captured by the camera). The controller also provides one or more profile adjustment outputs, which are used to adjust the light emission profile of one or more arrangements of light sources within the lighting assembly, such as one or more lighting panels.

In some examples, the controller 300 tracks a position of a camera using one or more position sensors. In some examples, the controller receives position signals from one or more position sensors that are placed at various locations, and position sensors include one or more of optical sensors, ultrasound sensors, wireless sensors, and/or other appropriate sensors. In some examples, a position sensor is coupled to a lighting panel, and the position sensor provides a sensor signal representative of a camera location relative to the lighting panel. In some examples, a sensor signal allows determination of a direction (e.g., represented by one or two angles) from the sensor to the camera. Additionally or alternatively, a position sensor receives a signal from a wireless device associated with the camera (e.g., wireless a beacon and/or transponder located on the camera). In some examples, a position sensor is an image sensor located proximate to the stage environment and used to determine the location of the camera. In such embodiments, a stage environment includes or otherwise be associated with positional markers, such as grid coordinates, that allows a camera location to be determined automatically or by a user.

In some embodiments, the controller 300 allows for a variety of types of adjustments, at varying levels of granularity, to a lighting assembly. For example, in some cases, the controller 300 enables adjustment of the light emission from individual light sources and/or lighting panels based on any suitable parameter (e.g., a background image, the stage environment, camera location, or user input, etc.). The controller 300 adjusts various illumination properties of a lighting assembly, such as spatial distribution of brightness and/or color balance over the lighting assembly. In some cases, the spatial dependence of lighting parameters is based on (e.g., mapped from) brightness and color balance data (e.g., averaged color balanced data) for corresponding portions of the background image.

In some examples, the controller 300 is configured to increase a brightness of a portion of the lighting assembly that illuminates a region of the stage within a field of view of the camera and/or to decrease a brightness of a different portion of the lighting assembly that illuminates a region of the stage outside a field of view of the camera. In some examples, portions of the lighting assembly (such as lighting panels) are not physically adjustable, and the controller varies the brightness of one or more panels based on the panel orientation relative to the camera. Thus, even if the panels are not physically adjustable, the emission profile (e.g., color and/or brightness) of light sources is adjusted based on the orientation of the lighting panel relative to the camera.

In some examples, light intensity at the camera is expressed as a light intensity parameter, which is based on one or more of the following: minimum detected brightness (or intensity of the light or of an image formed by the camera), the maximum detected brightness, or an average detected brightness. In some cases, a light intensity parameter is also based on noise levels within the camera image (the noise levels tend to fall as the light intensity increases) or on a selected ISO level by the camera imaging circuit (e.g., a light sensitivity level based on an international Organization for Standardization process).

In some cases, the controller 300 provides for flexible and adaptive adjustable light emission profiles (e.g., arrangement of light sources within an environment). Such profiles delineate one or more of the following: beam direction (e.g., the direction of maximum light emission intensity along a center-line angle for light emission from a light source), color balance, brightness, beam width (e.g., relating to the angular distribution of emitted light intensity), panel orientation, lighting unit orientation, flicker rate, time-dependent variations in intensity or other parameters, or any other suitable parameter.

In some cases, the controller 300 adjusts light emission profiles in any suitable manner. For example, in some examples, the controller 300 adjusts the light emission profile of a lighting assembly by re-orienting one or more lighting panels and/or using optical or electrooptical elements to modify the light emission profile. In some examples, different portions of a lighting assembly have different light emission profiles selected to provide illumination appropriate for the intended background of a scene, and the light emission profile of the lighting assembly is also adjusted to increase the light intensity received by the camera. This includes adjusting one or more of the brightness, color balance, or direction of light emitted by at least a portion of the lighting assembly.

Adjustment of the light emission profile of a set of lighting sources is achieved using any suitable type or form of control, including manual control or electronic control. Manual control includes adjustment of one or more lighting panel orientations, for example, using a handle. Manual control also includes adjustment of a portion of a panel or reorienting a beam direction relative to a panel.

In some examples, electronic control includes the use of actuators to adjust the orientation of lighting panels, panel portions, and/or optical elements. For example, in some cases, the controller 300 directs an actuator to adjust the light emission profile of one or more light sources of the arrangement of light sources by directing an actuator to move the light sources (e.g., by rotating a panel along one or more axes), which adjust the beam direction of the light sources.

In some cases, electronic control also involves adjusting electrooptically adjustable optical elements. For example, controller 300 adjusts electrooptical properties of lenses or prismatic sheets to adjustably redirect and/or focus light from one or more light-emissive devices or one or more lighting panels). Additionally or alternatively, electronic control involves phased array techniques that can be applied to each color channel of the pixel element to modify a light emission profile. In these examples, the beam direction from the light sources is adjusted by controlling the relative phase of emissions from the light sources. In such embodiments, the beam direction is adjusted in orthogonal directions, using, for example, a two-dimensional optical phased array. Additionally or alternatively, electronic control also involves reorienting pixel element emission angles within one or more panels or panel portions using any suitable approach and/or adjusting the collimation of light, which includes adjusting the convergence or divergence of a light beam.

In some embodiments, the controller 300 adjusts the beam direction for each panel within a set of panels so that the beam directions for each panel remain generally parallel. Additionally or alternatively, the controller 300 adjusts the beam directions of multiple panels based on camera position. For example, in some cases, the controller 300 increases the brightness of a lighting unit that is oblique to the camera view relative to the brightness of a lighting unit that is generally more squared relative to the camera. An increase in brightness of oblique lighting units is used to obtain a generally uniform lighting assembly brightness within a camera image. As another example, one or more beam directions are based on the location of a light source, such as a window within the background image.

In some cases, a lighting assembly is divided into portions, physically (e.g., as lighting panels or sub-panels) or electronically using the controller 300. For each portion (e.g., panel or group of panels), the controller 300 determines a light emission profile and determines a light emission profile adjustment (e.g., relative to a present or unadjusted state) that increases the amount of light from the lighting assembly that reaches the camera.

In some embodiments, alight emission profile defines camera data. In some cases, camera data includes one or more of the following: camera location (e.g., relative to the lighting assembly, or relative to the portion of the lighting assembly for which a light emission profile is determined), camera height (e.g., relative to a reference height such as a floor), camera tilt (e.g., a tilt angle of a camera support), camera direction (e.g., pointing direction, which is represented by azimuth and zenithal angles within a polar coordinate system, and refers to the direction of the center of the field of view of the camera), camera settings (e.g., aperture, frame time, resolution, or speed), camera zoom parameters (e.g., which are expressed as magnification or focal length), camera field of view (e.g., which is determined from the camera zoom parameter or from image data from the camera), signal level data (e.g., image brightness at the camera), camera image noise data (e.g., which are related to image brightness), camera motion (e.g., angular or translational speeds), or any other suitable camera data.

In some cases, the controller 300 identifies camera data in any suitable manner. As one example, the controller 300 determines the location and/or direction of the camera from the field of view of the camera as represented in image data obtained from the camera. As another example, the controller 300 identifies a camera light intensity parameter based on detected light intensity at the camera. In such examples, the controller 300 is configured to adjust the light emission profile of an arrangement of light sources to increase the light intensity detected by the camera. An algorithmic approach is used to increase the light intensity, such as an iterative algorithm used to determine the beam direction that gives the highest detected intensity of the detected light intensity at the camera.

In some cases, the controller 300 adjusts a light emission profile based on any type or form of camera data. For example, the controller 300 adjusts a lighting profile of a portion of a lighting assembly (e.g., an individual panel) based on the location of the camera in relation to the position of the portion of the lighting assembly. As another example, controller 300 detects that an object within the stage environment blocks part of the lighting assembly from the camera, and based on this camera data, considers the object as not being within the field of view of the camera and adjusts a lighting profile accordingly. Controller 300 also uses camera data (e.g., field of view data) to determine that a region of the stage within the field of view needs brighter illumination and, in response, increases the brightness of a portion of a lighting assembly directed to that region of the stage. For example, in some cases, the controller 300 determines that a portion of the lighting assembly is directed towards a portion of the stage of interest and increases the brightness of that portion of the lighting assembly and/or decreases the brightness of any other portions of the lighting assembly that do not contribute the lighting of the portion of interest.

In some examples, a lighting assembly is adjusted using a plenoptic camera (sometimes termed a light field camera) which provides data related to both light intensity and light direction at the camera. In some examples, a controller is configured to receive light intensity and beam direction data from a plenoptic camera and use light intensity and beam direction data to adjust the light emission profile of at least a portion of a lighting assembly.

In some embodiments, controller 300 uses camera data in conjunction with other data to determine how to adjust a light emission profile. For example, if controller 300 detects that the surface normal of a lighting assembly is directed away from the camera, then the controller 300 adjusts the light emission profile so that the beam direction is generally directed towards the camera.

The controller 300 determines the brightness of a lighting panel by identifying a relative angle between the camera and the lighting panel. For example, controller 300 sets lower brightness for a lighting panel that is generally normal (e.g., square on) to the central axis of the camera field of view than a lighting panel that is angled (or oblique) relative to the camera. For example, if the beam direction from a lighting panel is generally parallel to a central axis of the field of view of the camera, the controller 300 sets the brightness of the panel to be lower than another panel for which the beam direction has an appreciable angle with the central axis of the field of view of the camera.

The controller 300 sets the relative brightness of different panels in a variety of different lighting contexts. For example, a lighting assembly includes an arrangement of lighting panels having first lighting panels with a first orientation and a first brightness and second lighting panels having a second orientation and second brightness. In this example, controller 300 determines that the first and second orientations are different, and based on this difference, sets the first and second levels of brightness so that the apparent brightness of each panel in corresponding camera image data is at least approximately equal. For example, the beam directions from each set of panels are configured (e.g., with prisms, lenses, or other optical elements) to be generally parallel to each other and directed towards the stage (e.g., towards a camera location). In such embodiments, the brightness is based on the orientation of the panel relative to the camera (e.g., the subtended angle of view of the lighting panel at the camera) or based on the angle (q) between beam direction from the panel and the central axis of the camera field of view. In this example, the brightness scales as 1/cos(q) (or other function), being greater for larger oblique angles.

In some embodiments, the light emission profile varies as a function of position over the lighting assembly. For example, a light emission profile varies based on the position of the camera relative to a particular portion of the lighting assembly or relative to a representation of light sources in a background image. This enables the beam direction to be adjusted by physical reorientation of a portion of the lighting assembly. As noted above, aligning the beam direction from a portion of the lighting assembly along a direction generally towards the camera increases light intensity received by the camera. Additionally or alternatively, light wastage is reduced by narrowing the beam width (e.g., by narrowing the angular distribution of light intensity emitted by the arrangement of light sources relative to the beam direction, which increases the intensity of light).

In some examples, a lighting assembly has a set-up mode during which light emission profiles from the lighting assembly are adjusted. During setup, the controller 300 creates and/or adjusts a lighting profile for the lighting assembly. In some embodiments, the controller 300 determines which adjustments have the greatest effect within a particular environment. The controller 300 then prioritizes adjustments that provide benefits greater than a predetermined value (e.g., adjustments that provide an increase in light levels received by the camera above a predetermined value or proportion). In some embodiments, such adjustments are limited to those that change the beam direction by greater than a threshold (e.g., a redirection of 5, 10, or 20 degrees or greater).

During set-up, the controller 300 receives image data from the camera and adjusts the light emission profile (e.g., beam direction and/or beam width) of light sources within the lighting assembly to increase light levels at the camera, increase or reduce light emission brightness to reduce power consumption while maintaining a threshold light level at the camera, and/or adjust illumination levels for different portions of the lighting assembly to increase lighting efficiency (e.g., to reduce brightness of lighting units that fall outside the field of view of the camera and/or increase).

Figure 4A:
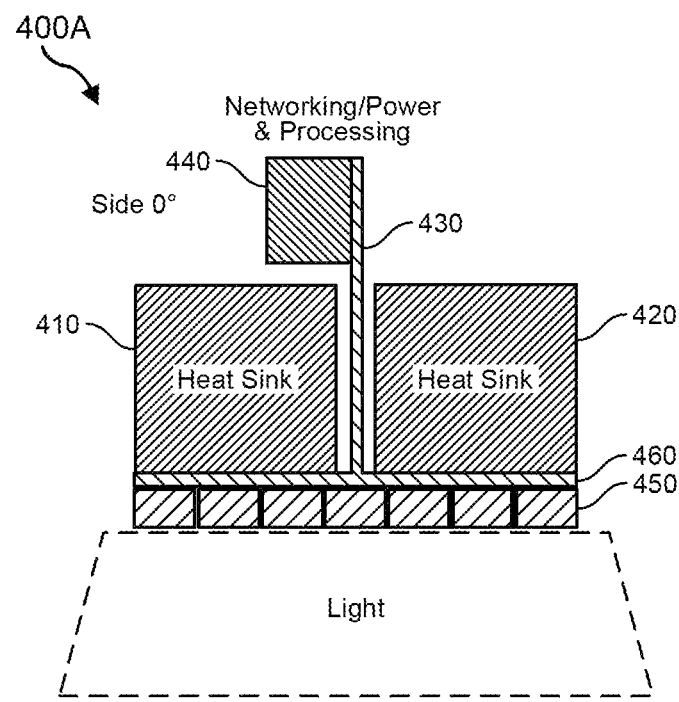
FIGS. 4A and 4B each illustrate a cross-section of a lighting assembly that includes an arrangement of light sources.
Figure 4B:
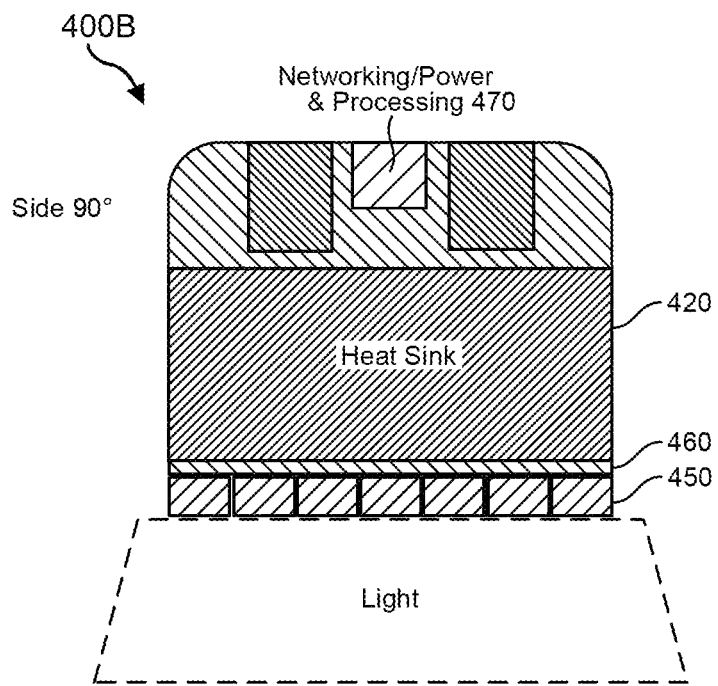

FIGS. 4A and 4B each show a cross-section 400A/400B of a lighting assembly 400, or a portion thereof, that includes an arrangement of light sources 450. The direction of light emission from the light sources is considered to be the forward or front direction, and the arrangement of light sources has a heat sink 410/420 and/or electrical connections 430/460 at rear or back portion 440 of the assembly. This back portion 440 of the lighting assembly includes controllers, processors, networking devices, or other computational or networking equipment 470. In this view, the rear is towards the top of the figure and the front is towards the bottom.

Figure 5:
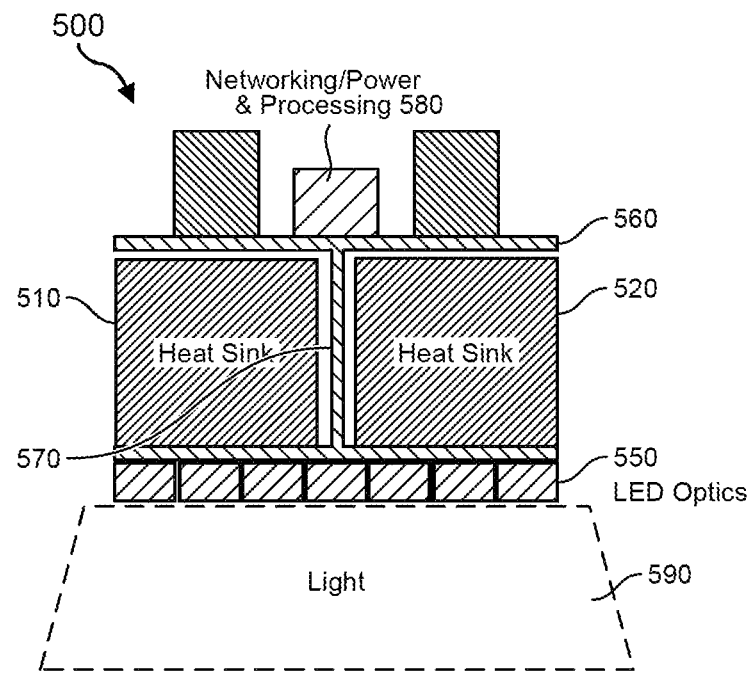
FIG. 5 illustrates a cross-section of an alternative example lighting assembly that includes an arrangement of light sources.

FIG. 5 shows a cross-section of an example lighting assembly 500 similar to that of FIGS. 4A and 4B. The lighting assembly includes heat sinks 510/520, electrical connections 560/570, and light sources 550 (e.g., LED optics devices). The lighting assembly 500 thereby provides the projected light 590. In some cases, the lighting assembly 500 further includes networking and processing devices 580. These networking and processing devices 580 receive input signals, generate commands or control signals, and send those control signals to the light sources 650, either individually or as a group.

Figure 6:
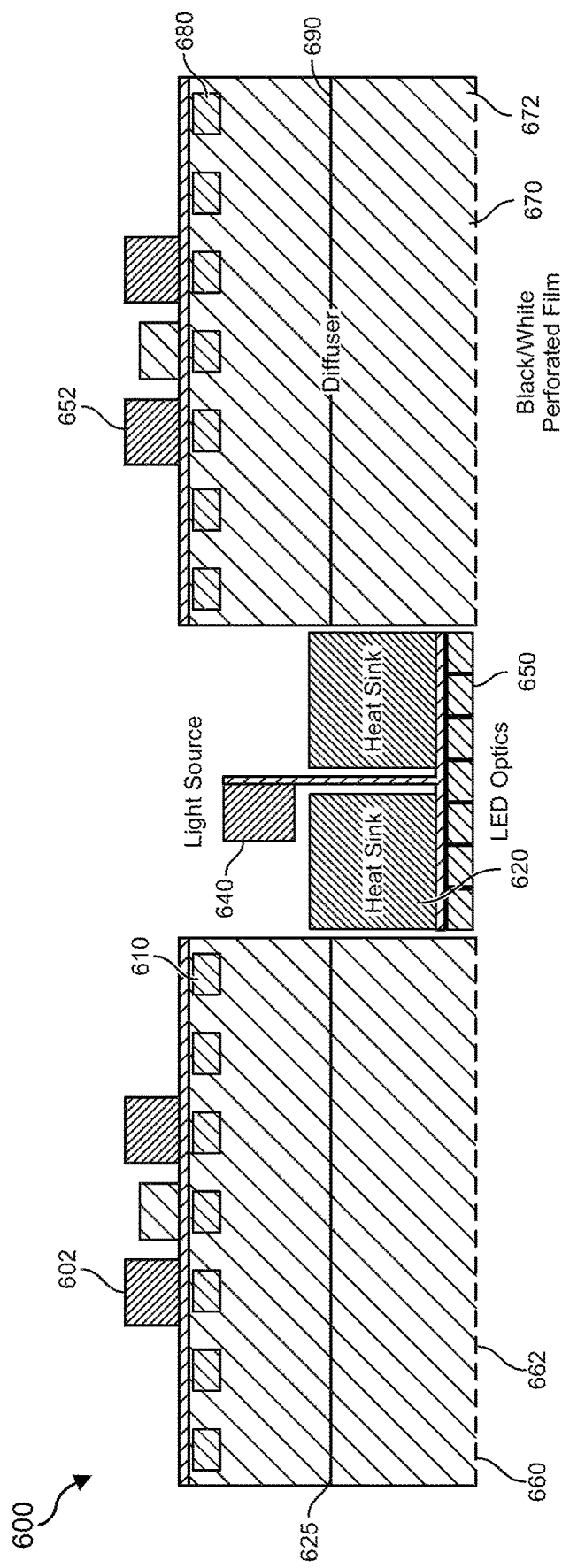
FIG. 6 illustrates a cross-section of an alternative example lighting assembly that includes an arrangement of light sources.

FIG. 6 shows a cross-section of a further example lighting assembly 600, or a portion thereof. The example lighting assembly 600 shown in FIG. 6 includes an arrangement of light sources 610/680, a diffusion layer 625/690, at least one heat sink 620, and a perforated layer 660/670 located on the front or light emissive surface. The perforated layer 660/670 includes perforations or apertures 662/672, respectively. A reflective film surrounds the enclosure located between the light sources and the perforated layer. The diffusion layer is approximately mid-way between the light sources and the perforated layer. In some cases, the lighting assembly 600 further includes networking and processing devices 602/640/652. As above, these networking and processing devices 602/652 receive input signals, generate commands or control signals, and send those control signals to the light sources 610/680, either individually or as a group.

The lighting assemblies shown in FIGS. 4A-6 includes any suitable arrangement of any suitable type or form of light sources. Such light sources include light-emitting diodes (LEDs) or any other suitable display technology, such as a backlight in combination with, for example, a liquid crystal panel or other electrooptic shutter. Furthermore, in some examples, a white light source (such as one or more LEDs, fluorescent lamps, or the like) is used, optionally in conjunction with color filters and/or light shutters. Any of these examples of lighting sources may be located in any suitable arrangement, such as a square, a rectangular or hexagonal array, and/or a regular or irregular arrangement of any other suitable shape or size. Furthermore, at least in some cases, individual emissive elements in a lighting arrangement have one of many different suitable shapes, such as circular, square, or rectangular emissive surfaces. In some examples, a lighting assembly also includes a phased array of light sources.

Lighting sources may also be any suitable color. For example, LEDs used in lighting arrangements include one or more of red, orange, yellow, green, blue, violet or multicolor LEDs. In other embodiments, multicolor LEDs are used. In some cases, the LEDs have tunable wavelengths. In some examples, a multicolor LED has a color balance that is electrically adjusted, for example, by adjusting current flow through two more light-emissive semiconductor elements. LEDs also include phosphor films, such as a white (or other color emissive) phosphor illuminated by a UV or violet LED. Additionally or alternatively, LEDs include one or more emissive elements that are spectrally tunable and include phosphor layers configured to provide a desired spectral emission. Furthermore, at least in some cases, the pixel size of the LCD panel is large, such as those that have at least one edge length of least 10 mm, such as at least 20 mm. However, an arrangement of LEDs provides advantages over the use of an LED panel, such as the reduction of light wastage in the polarizers.

In some cases, a light source is associated with one or more optical elements, such as refractive elements (e.g., one or more lenses and/or prisms), reflective elements (e.g., one or more mirrors), and/or diffractive elements (e.g., one or more gratings). An optical element is used to modify one or more emission parameters of a light source, beamwidth, beam direction, focus, and the like. A lighting assembly includes an optical element assembly, such as a sheet having an arrangement of lenses, prisms, or other optical elements disposed thereon. An LED emits light along a range of angles, and the beam direction represents a center beam or principal beam of the emitted light, such as the direction of maximum emitted light intensity, and the beam direction is modified by one or more optical elements.

In some examples, a lighting assembly includes an optical element that includes an arrangement of microlenses configured so that beam deflection is obtained in one or both of orthogonal planes by adjusting the position of the optical element in one or both of orthogonal directions. In some cases, an individual lens surface includes a circular, cylindrical, or parabolic lens. In some cases, lenses are arranged in an array spaced at intervals along one or more directions. In a no-deviation initial mode, lenses are in positional register with each light source, so no beam direction adjustment is obtained. Movement of the optical element, either using electronic control or by a user, then deflects light emission from some or all optical elements.

In some examples, the lenses are in register with light sources in some portions of a lighting panel and out of register in another portion of the lighting panel. This is used to obtain a variable beam deflection from different parts of the lighting panel. This approach is used to remove visual artifacts from near corners between panels, as further discussed below. In some examples, lenses are replaced with curved ribs (e.g., cylindrical lenses) allowing adjustable beam deflection within a single plane only.

In some examples, the spacing between individual light sources is sufficient to prevent effective display of the background image on the lighting assembly. In some examples, the spacing between individual light sources (e.g., LEDs) is between approximately 1 mm and approximately 100 mm (e.g., at least 10 mm, at least 20 mm, etc.). In some examples, the LEDs have a square or circular cross-section having at least one dimension (e.g., edge length, diagonal or diameter) that is greater than approximately 1 mm, greater than approximately 2 mm, greater than approximately 4 mm, etc.

In some examples, the LEDs in a lighting arrangement need not provide a background image, allowing individual LEDs to be separated by greater distances (e.g., millimeter distances). This provides for significant cost savings compared to traditional LED-based displays.

Example lighting assemblies provide high quality color rendition, for example, including broad spectrum lighting that produces good skin tones and expected costume and prop appearance. In some embodiments, example lighting assemblies also provide continuous illumination. A diffuser or other optical element is used to generate a more uniform spatial distribution of brightness to reduce the appearance of separated individual light sources.

In some embodiments, using a combination of an arrangement of light sources and a diffuser alone results in one or more problems, such as visible reflection of external light from the front surface of the diffuser, visible hot spots within the illumination field due to the discrete light sources, aliasing issues, moiré effects, and the like. In some examples, a diffuser is configured to reduce these artifacts and/or undesirable effects. For example, in some cases, a diffuser is configured to provide reduced moiré effects, for example, by having a repeat distance of topographic features along one or more directions that is not a simple integer ratio of the light source separation along the corresponding direction. Using this approach, aliasing artifacts are reduced when cameras (e.g., with a regular arrangement of detector pixels) are used, particularly if the camera is focused on or near a light emissive surface. Also, in some examples, the albedo of the lighting assembly is reduced by providing dark regions (e.g., black plastic) between individual light sources. For example, light sources are supported by a circuit board having a dark surface facing outwards. In some examples, a black polymer layer (e.g., black plastic) or pigmented layer is applied to portions of the light source assembly, such as portions of a circuit board or other support structure.

In some examples, alighting assembly has a low surface albedo and a highlight output efficiency. The light source includes a layer having an arrangement of apertures through which light passes, which is referred to as a perforated layer, located over the light emissive surface. In some examples, the perforated layer has a black surface on the front that provides a low albedo, and white surface (or other reflective surface such as a mirror finish) on the back to reflect light back into the light source and thereby recycle light that is not transmitted through the apertures. In this context, perforated refers to an arrangement of apertures or holes through which light passes. An aperture includes a clear portion of a layer, and the description of a layer as perforated does not necessarily imply the presence of holes extending through the layer.

In some embodiments, lighting assemblies include configurations that include or readily facilitate the formation of windows (e.g., openings) therein (e.g., for video cameras and/or video projectors). For example, a lighting assembly includes one or more windows (which are openable as required) through or into which a camera, additional lighting unit, or other device is inserted or otherwise placed. In some examples, a camera records through a window in the lighting assembly that is reversibly opened and does not require removal of an entire LED panel.

Figure 7:
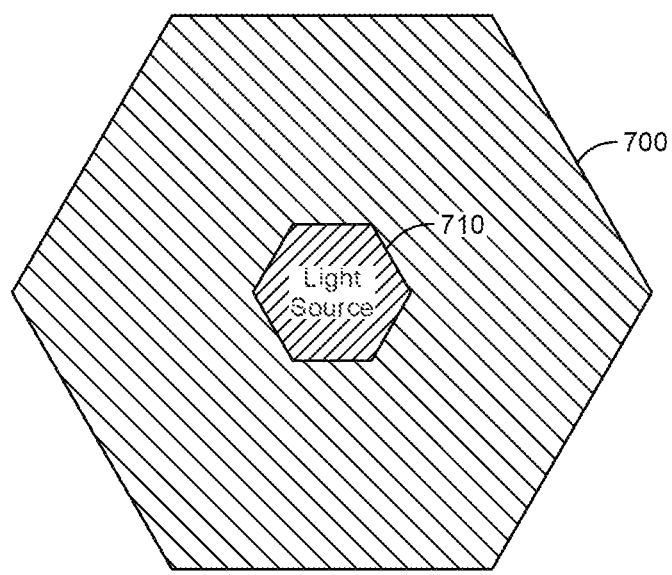
FIG. 7 illustrates an example light unit having a light source at the center.

FIG. 7 shows an exemplary light unit 700 with a light source 710 at the center. While FIG. 7 shows hexagonal light unit, in other examples a light unit has a square, rectangular, triangular, or other geometric or non-geometric (random or quasi-random) arrangement. In some embodiments, a light unit includes one or more light units, which is a panel supporting an arrangement of light sources such as LEDs. Also, while FIG. 7 shows a light at a center of a light unit, in some examples, one or more light sources are located within one or more corners of light unit (e.g., for a polygonal shape).

In one exemplary embodiment, an example LED-based light unit was fabricated having a light emission of 2700 nits. Different types of perforated layer were then placed on the light emissive surface of the light source and the brightness was measured for each layer type. A brightness of 830 nits (31% efficiency) was observed with a layer having two black surfaces. A brightness of 1400 nits (52% efficiency) was observed with a layer having a white surface on the rear. The albedo of the rear surface (the white material side facing the diffuser) was approximately 90% (ignoring the holes in the perforated layer). The albedo of the front side (e.g., a black material side facing outwards) was approximately 9%. In some examples, the albedo is less than 10%, such as less than 5%. In this context, the rear or inwardly facing surface faces the diffuser and the light sources (e.g., LEDs) and the front or outwardly facing surface faces the illuminated region, such as a stage environment and any objects located within the stage environment.

Figure 8:
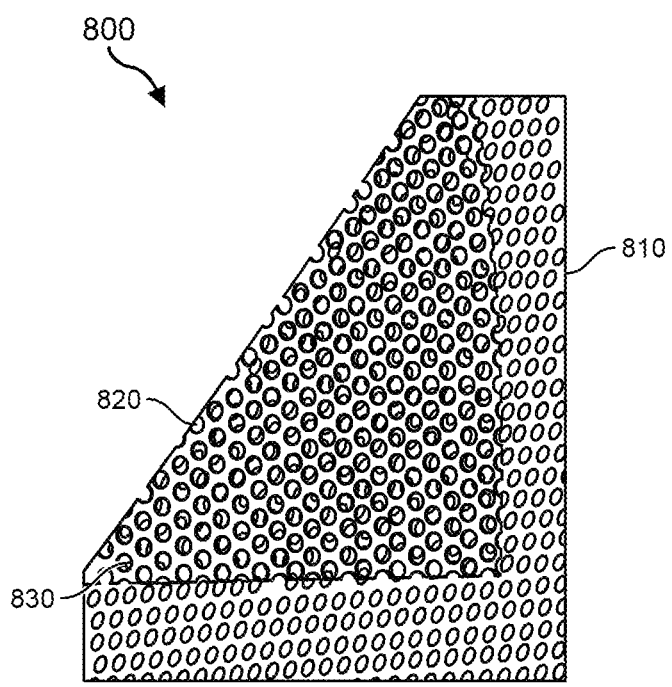
FIG. 8 illustrates an example perforated layer including an arrangement of apertures within a layer that has a more reflective side and a less reflective side.

FIG. 8 shows an example perforated layer 800 including an arrangement of apertures 820 within a layer having a darker side 830 and a lighter side 810. In some examples, an example black/white perforated layer is located on the front of the light unit (e.g., supported by an enclosure) that is configured to reduce stray reflectance of light from the lighting assemblies. The films effectively recycle some of the blocked light back into the light source, for example, by having a light (e.g., white) or reflective surface facing the light source.

Figure 9:
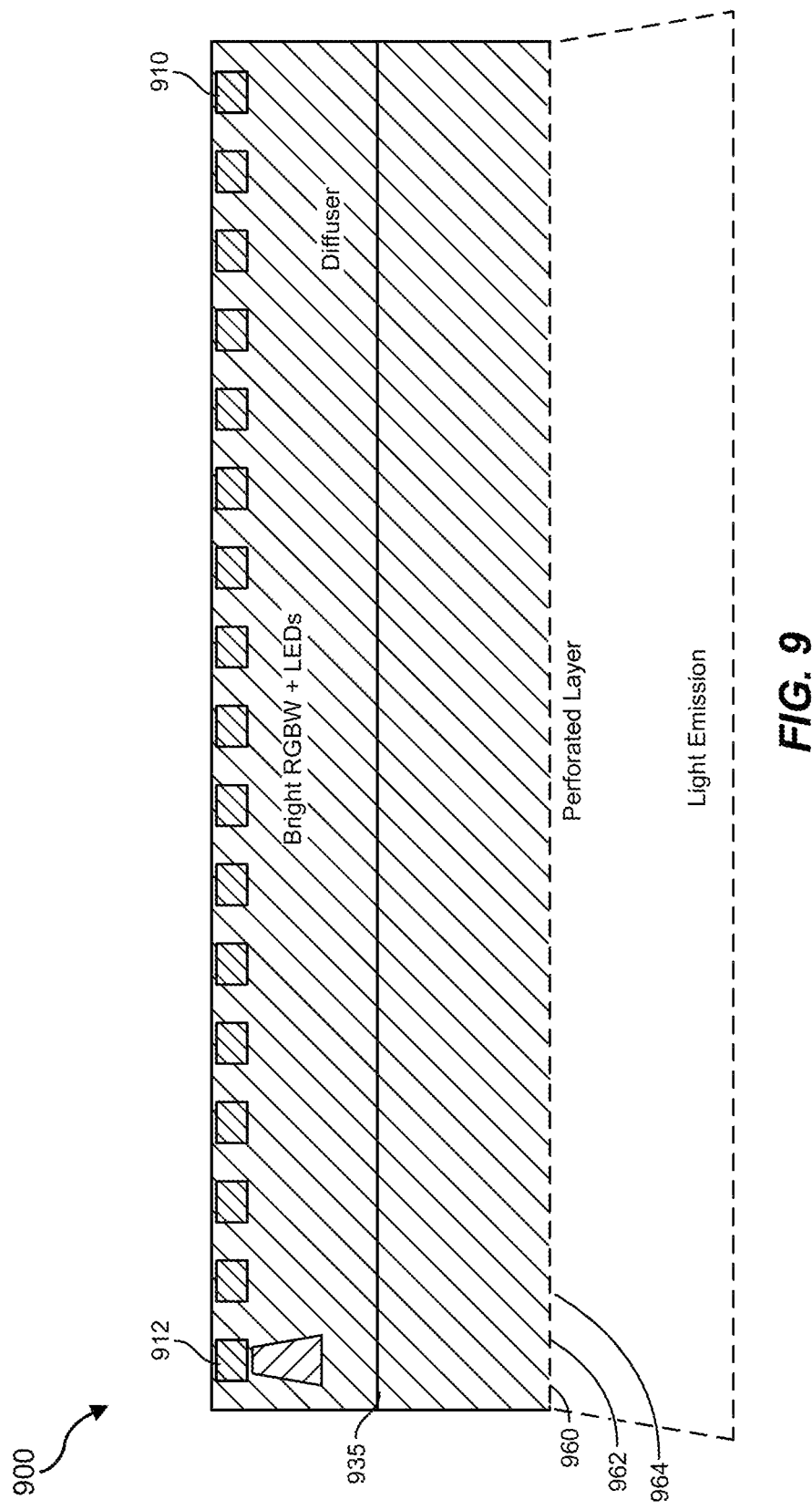
FIG. 9 illustrates an example lighting unit including an arrangement of LEDs, a diffuser, and a perforated layer.

FIG. 9 shows an example lighting unit 900 including an arrangement of LEDs 910/912 (e.g., red, green, blue, white, and other color or multicolor LEDs), a diffusion layer 935, and a perforated layer 960 that has an inward-facing surface 962 that is light colored (e.g., white, mirror, or otherwise reflective) and an outward-facing surface 964 that is dark (e.g., black in appearance or otherwise dark). In some examples, light is generated by LEDs (e.g., high-powered multispectral LEDs) at the back of the enclosure, which have light colored surfaces inside (e.g., white or otherwise light colored and/or reflective). The LED light passes through a diffuser to provide continuous area illumination. A perforated layer (e.g., a panda film) presents a low-albedo surface outward and allows a percentage of light to escape through an arrangement of holes, and recycles the blocked light back to the diffuser (e.g., by scattering or reflection) so that the light has a greater chance to pass through the apertures.

In some examples, lighting assemblies have a low reflectivity, for example, having a light emissive surface having a dark appearance that is close to a black surface. This reduces stray light reflections within the stage environment. The dark surface is provided by the dark side of the perforated layer.

In some examples, a perforated layer comprises a generally black polymer layer laminated to a generally white polymer layer. Apertures are formed through the polymer multilayer to form the perforated layer. In some cases, apertures are circular and have a diameter of between approximately 0.1 mm and approximately 5 mm, such as between 0.1 mm and 3 mm. In some examples, a black polymer film is metalized on one side where the metalized side is used as a reflective first side. In some examples, a protective layer is applied on the first and/or second side, such as a transparent polymer or dielectric film. In some examples, a transparent, light colored, or diffusive film supports a black layer (e.g., a black polymer or carbon-based material) and apertures are formed by forming holes in the black layer.

Apertures are fabricated using any suitable approach, such as one or more of the following: laser cutting, removal (e.g., ablation) of an absorbing and/or reflective coating, physical perforation, or any other suitable approach.

In some examples, the rear surface of a perforated layer has a reflective rear coating, for example, a metal film (e.g., aluminum, silver, gold, or any other stable metal or alloy thereof). In some examples, the rear surface has a light colored (e.g., white) surface and/or scattering surface (e.g., Including titanium dioxide).

In some examples, a perforated layer includes one or more polymer films. In some cases, a polymer film includes one or more polymers such as one or more of the following: a polyester (e.g., a polyethylene terephthalate such as biaxially-oriented polyethylene terephthalate), a polyether, a polyacrylate, or any other suitable polymer. In some examples, a perforated layer includes an optically transparent polymer.

In some examples, the thickness of the perforated layer is between approximately 0.05 mm and approximately 2 mm, such as between approximately 0.1 mm and approximately 1 mm.

In some examples, a perforated layer is applied to the light emissive surface of a lighting assembly including a plurality of light sources and a diffuser. In some cases, the perforated layer is applied over a relatively inexpensive (e.g., low resolution, relative to display panels) LED-based lighting panel. The perforated layer is a light color on an inner side (facing the diffuser and light sources, e.g., a white or reflective surface) and black color on an outer side (e.g., facing the stage environment). The light color inner side reduces light wastage and improves apparatus efficiency. Measurements showed that a white inner side of the perforated layer increases the apparatus brightness by at least 20% and more in some examples.

In some examples, the performance of a lighting assembly is improved by including a perforated layer located at or near the front (e.g., light emissive) surface of the lighting assembly. The perforated layer includes an arrangement of apertures through which light exits the lighting assembly and, for example, illuminates a stage. In some examples, the perforated layer has a first side having a low reflectance for one or more wavelengths of visible lights that have a dark appearance, such as a black color. In some examples, the perforated layer has a second side having a light appearance, such as a white color, or that are reflective. The perforated layer is arranged so that the first side faces the diffuser and light sources (the inner surface of the perforated layer) and the second surface faces outwards, for example, towards the area to be illuminated.

Figure 10:
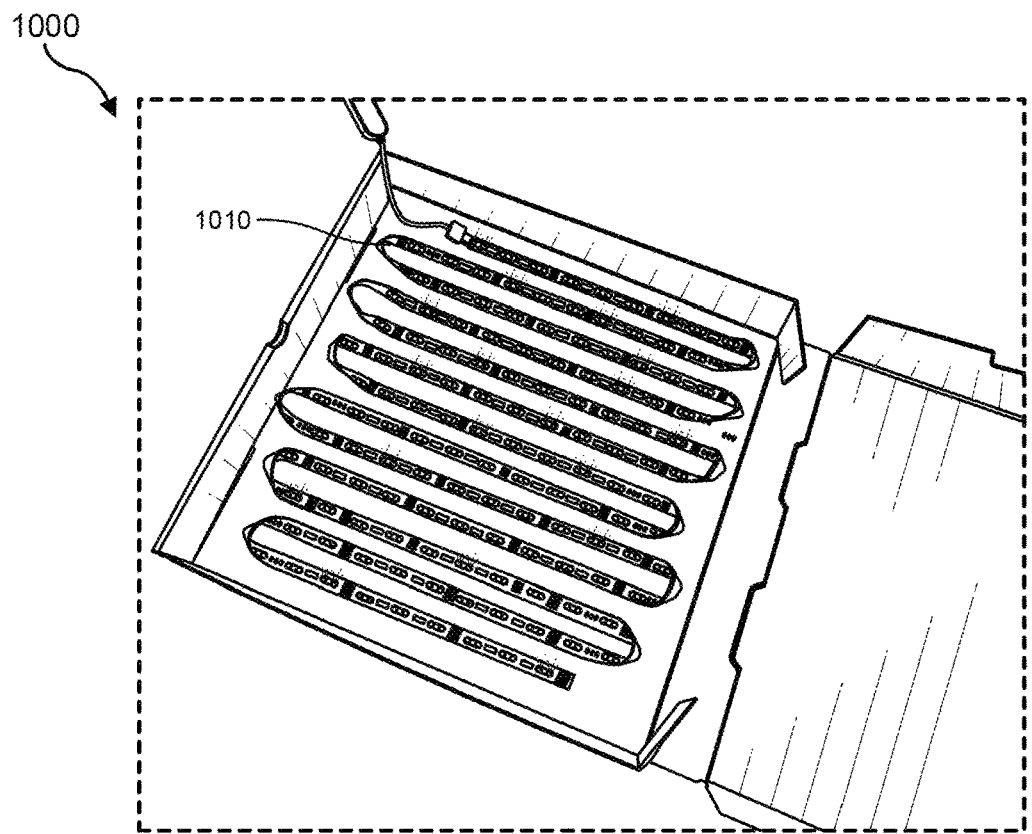
FIG. 10 illustrates an example light unit including a controllable LED light strip.

FIG. 10 shows an example light unit 1000 including a controllable RGBWW LED strip 1010. The plurality of LEDs includes both warm and cool white LEDs as well as RGB LEDs. LEDs are provided by an LED strip that is arranged within a housing (e.g., 1220 of FIG. 12) of the lighting assembly or a light unit. The LED strip is attached inside a white (e.g., flat white) or reflective enclosure and arranged in a serpentine manner.

Figure 11:
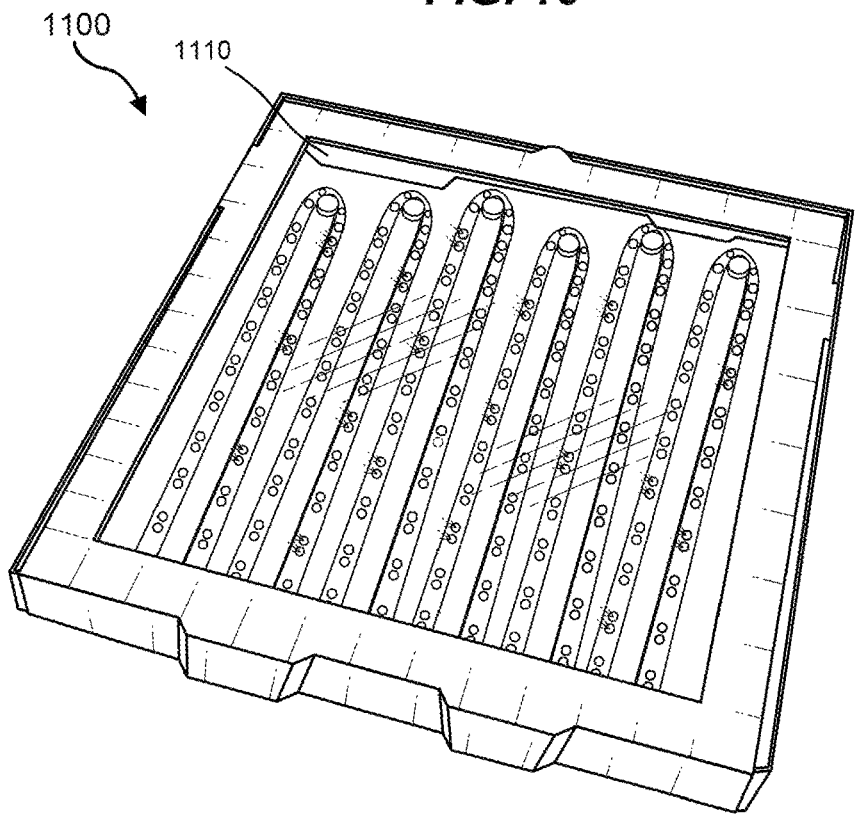
FIG. 11 illustrates an example lighting assembly including a diffuser located near the front of the enclosure.

FIG. 11 shows an example lighting assembly 1100 including a diffusion layer 1110 located near the front of the enclosure to provide a more uniform illumination pattern. In some cases, the diffuser includes one or more light-diffusive sheets. The brightness of the lighting assembly was measured as 830 nits.

Figure 12:
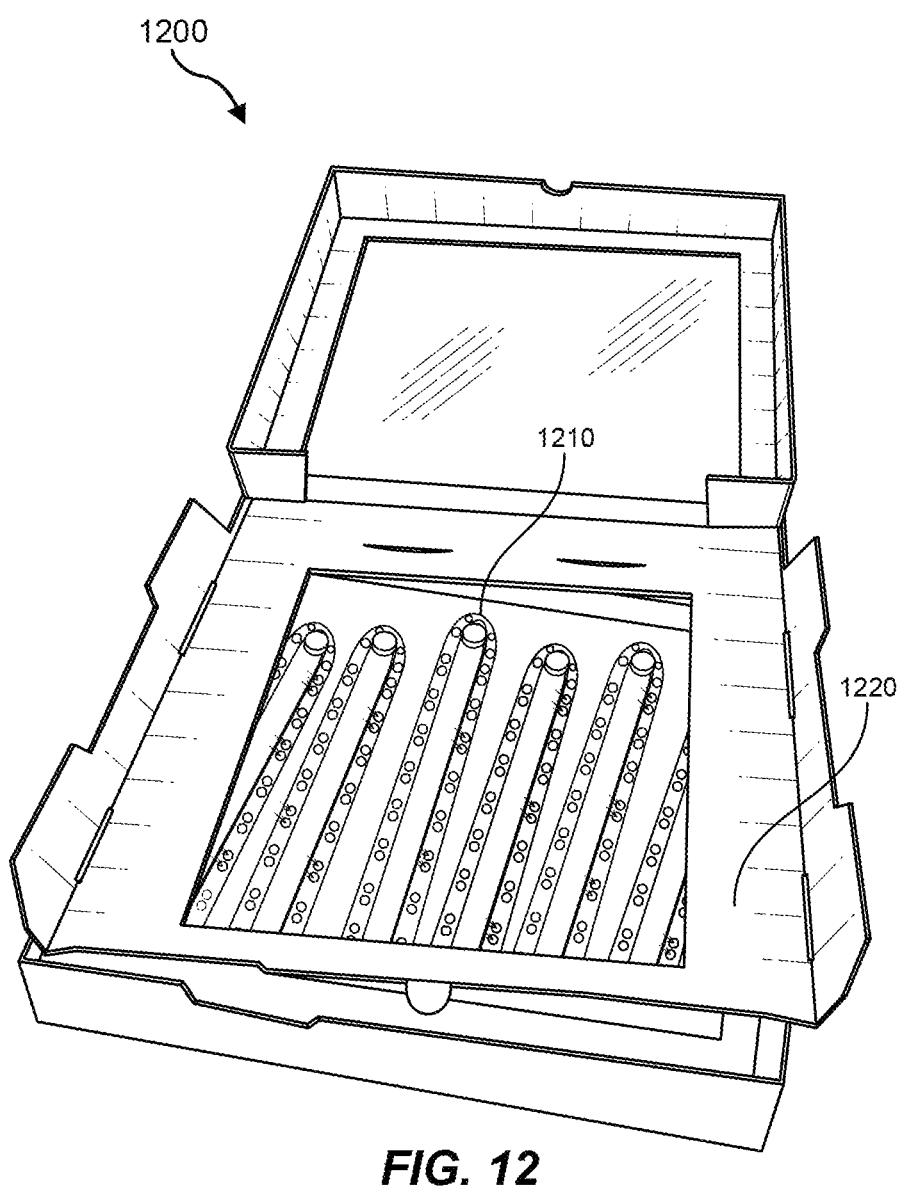
FIG. 12 illustrates an alternative illustration of an example lighting assembly.

FIG. 12 shows another illustration of an example lighting assembly 1200 with an LED strip 1210. In some examples, a perforated layer is located in front of the diffusion screen. In some cases, the perforated layer (e.g., 800 of FIG. 8) is a film that has a dark front surface to reduce the front side albedo and a light rear surface. In this example, adding the perforated layer reduced the brightness. In an example prototype, the brightness was reduced to 300 nits.

In some examples, the separation distance between apertures (e.g., a center-to-center separation between apertures as measured along one or more directions) is between approximately 0.5 mm and approximately 10 mm, between approximately 1 mm and approximately 5 mm, approximately 2.5 mm apart, etc. In some examples, the separation distance is measured along a direction parallel to an edge or diagonal of an illumination assembly. In some examples, an illumination assembly is rectangular (e.g., square) or any other geometric or non-geometric shape.

Figure 13:
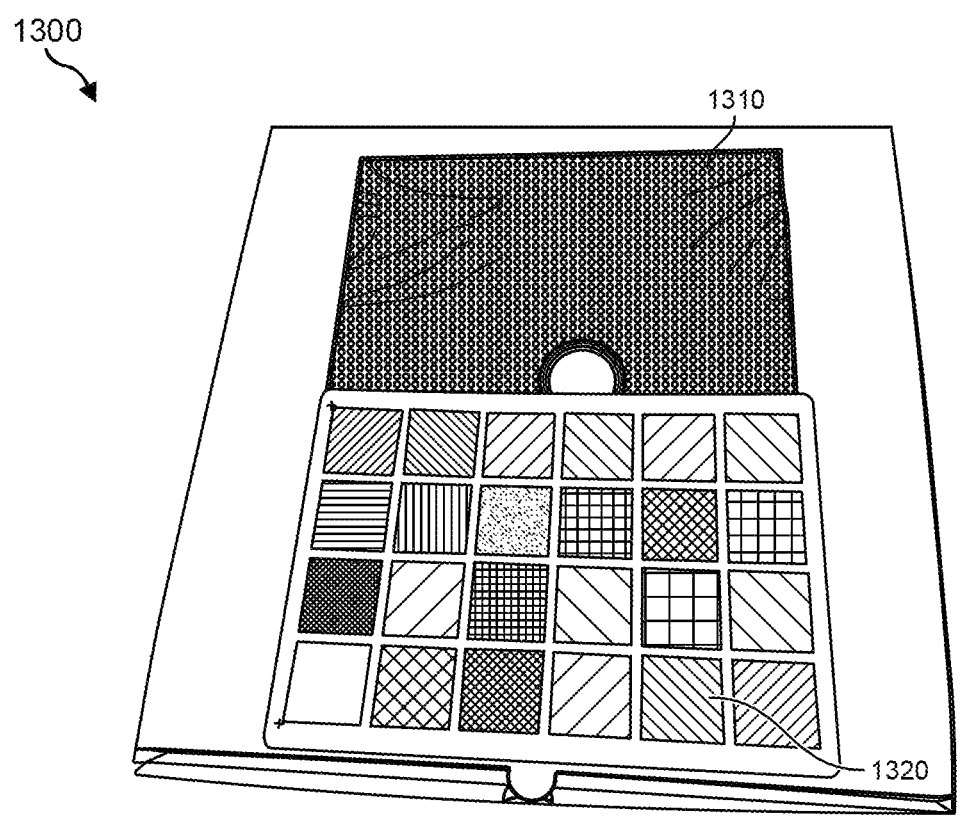
FIG. 13 illustrates an example lighting assembly that includes an arrangement of light sources, a diffuser, and a perforated layer.

FIG. 13 shows an example prototype lighting assembly 1300 including an arrangement of light sources 1310, a diffusion layer, and a perforated layer. The perforated layer has a light-colored inner surface and a dark-colored outer surface. Under ambient light, the reflectivity of the outer surface (e.g., a black perforated surface) is less than approximately 20%, less than approximately 10%, between about 1% and appr 9%, or any other suitable value.

In some examples, there is a space between the perforated layer and the diffuser and between the diffuser and the light sources. In some cases, the separation distance between the light sources and the diffuser is in the range of approximately 5 cm to approximately 1 m, between 10 cm and 90 cm, between approximately 10 cm and approximately 50 cm, etc. Similarly, the separation distance between the diffuser and perforated layer is, at least in some cases, in the range of approximately 5 cm to approximately 1 m, between 10 cm and 90 cm, between approximately 10 cm and approximately 50 cm, etc. In some examples, the separation distances between the diffuser and the light sources and between the diffuser and the perforated sheet are the same, approximately the same, or appreciably different. In some examples (e.g., for a reflective, partially reflective, or "shiny" film) the albedo of the outer surface is approximately equal to the square of the hole fill factor. The albedo of the outer surface is reduced by providing a perforated layer having a matte (e.g., not shiny) surface and smaller holes to reduce reflection.

In some examples, the apertures have a spatial distribution that reduces moiré pattern formation by the image sensor used for recording, such as a quasi-random or hexagonal distribution or other spatial distribution that differs from the image sensor pixel arrangement.

As noted above, moiré patterns 1320 are visible, for example, as a result of relationships between the pitch of light sources and the spatial separation of apertures. Moiré patterns are reduced or eliminated by adding a random component to the aperture locations, for example, by using a jittered location pattern. In some examples, the aperture locations are based on a regular arrangement (e.g., an array) combined with a random displacement in one or more directions. In this context, random includes quasi-random. For example, the location along a direction (e.g., denoted the x direction) is given by $x=x_0+Dx$, where x is the aperture location (e.g., the location of the center of the aperture along the x direction), $x_0$ is a location on an array and Dx is a random displacement from $x_0$. In some examples, Dx is given by $Dx=R \cdot Dx_{max}$, where R is a random factor between −1 and +1 and $Dx_{max}$ is approximately half the separation between locations on the array in the corresponding direction (in this example, the x direction). Similarly, the location along a second direction (e.g., an orthogonal direction denoted the y direction) is given by $y=y_0+Dy$, where y is the aperture location (e.g., the location of the center of the aperture), $\gamma_0$ is a location on an array and $D\gamma$ is a random displacement from $\gamma_0$.

Some moiré patterns arise, for example, from numerical relationships between two or more of: aperture spacings, light source spacings, and camera pixel spacings. In some examples, a camera has a regular (e.g., grid) array of pixels, resulting in aliasing effects and the appearance of areas of dark and bright patterns (e.g., wavy patterns) within camera recording images. These effects are reduced using a different arrangement of apertures and/or light sources than that of the arrangement of camera pixels. For example, with a rectangular array of camera pixels, moiré pattern generation is reduced with a hexagonal arrangement of light sources. Moiré patterns are further reduced by using a jittered sampling pattern for aperture location. The aperture arrangement includes a random or quasi-random component. A darker surface is also obtained by introducing topographic features (such as concavities or other depressions) in the outer surface of the perforated film surrounding the apertures. For example, if an external light beam is incident on a depression in the outer surface, such as a pit or groove, reflection is appreciably reduced.

Figure 14:
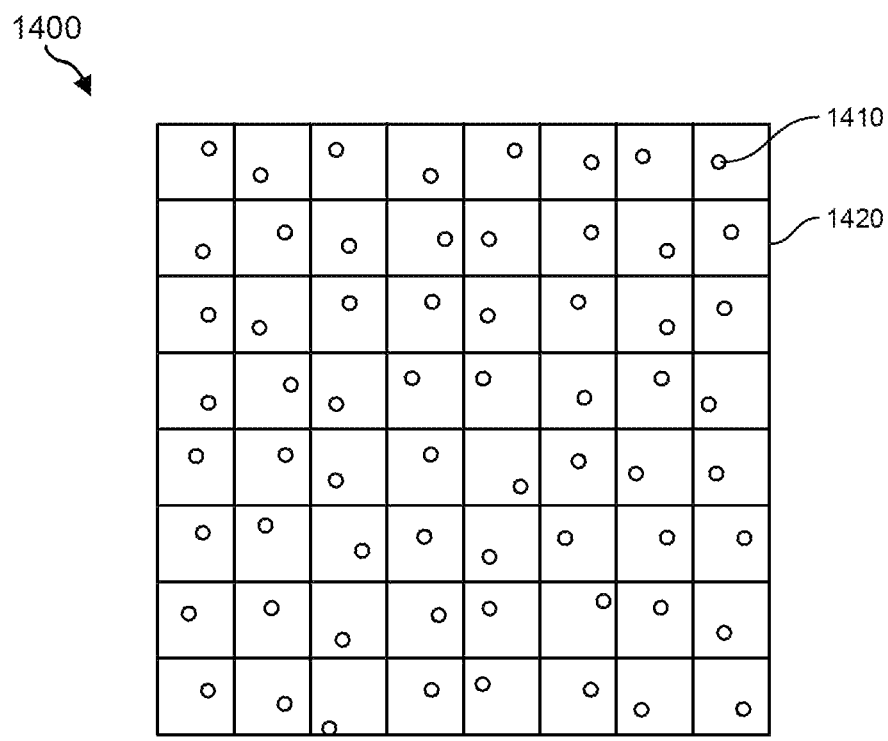
FIG. 14 illustrates a jittered arrangement of apertures within a perforated layer.

FIG. 14 shows a jittered arrangement of 1400 of apertures within a perforated layer 1420 that are used to reduce the appearance of moiré patterns. The perforated film is configured using an aperture pattern that produces less moiré effects. In some examples, the aperture locations are stochastically jittered samples (e.g., 1410).

In some examples, the light emissive surface of a lighting assembly includes one or more perforated layers. In some examples, two or more perforated layers are joined together (e.g., to have substantially adjacent edges), for example, using one or more of the following approaches: adhesive (e.g., between adjacent edges), adhesive tape (e.g., cellophane tape), or by adhesion or otherwise securing the layers to a substrate (e.g., a diffuser or window).

Figure 15A:
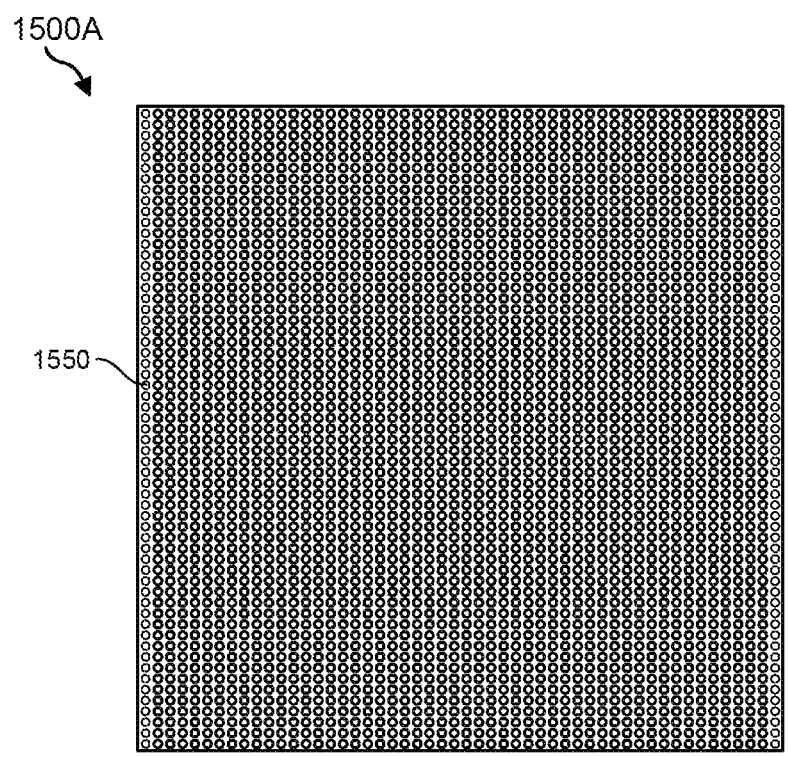
FIG. 15A illustrates an arrangement of apertures usable with an array of light sources.
Figure 15B:
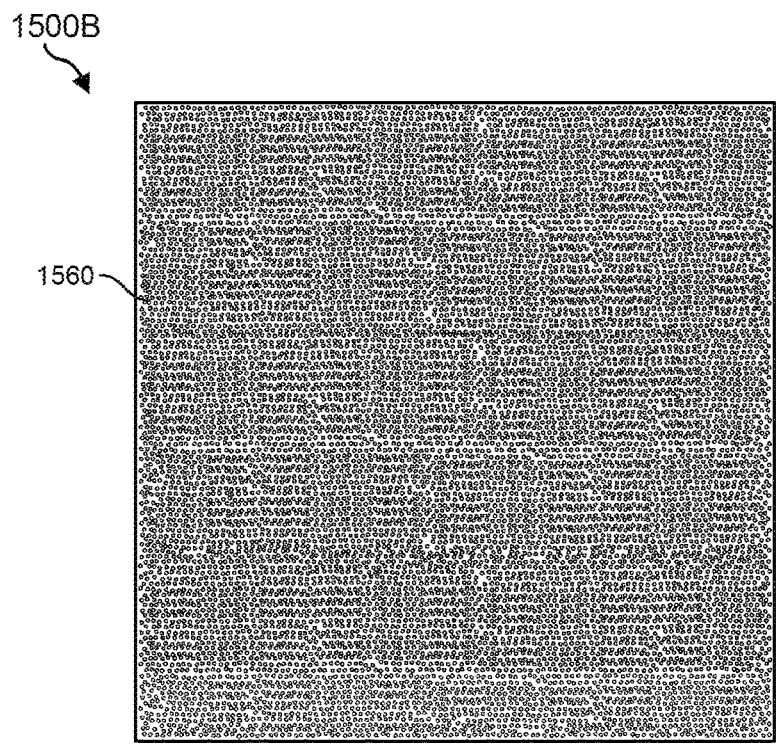
FIG. 15B illustrates a jittered arrangement of apertures usable with an array of light sources.
Figure 16:
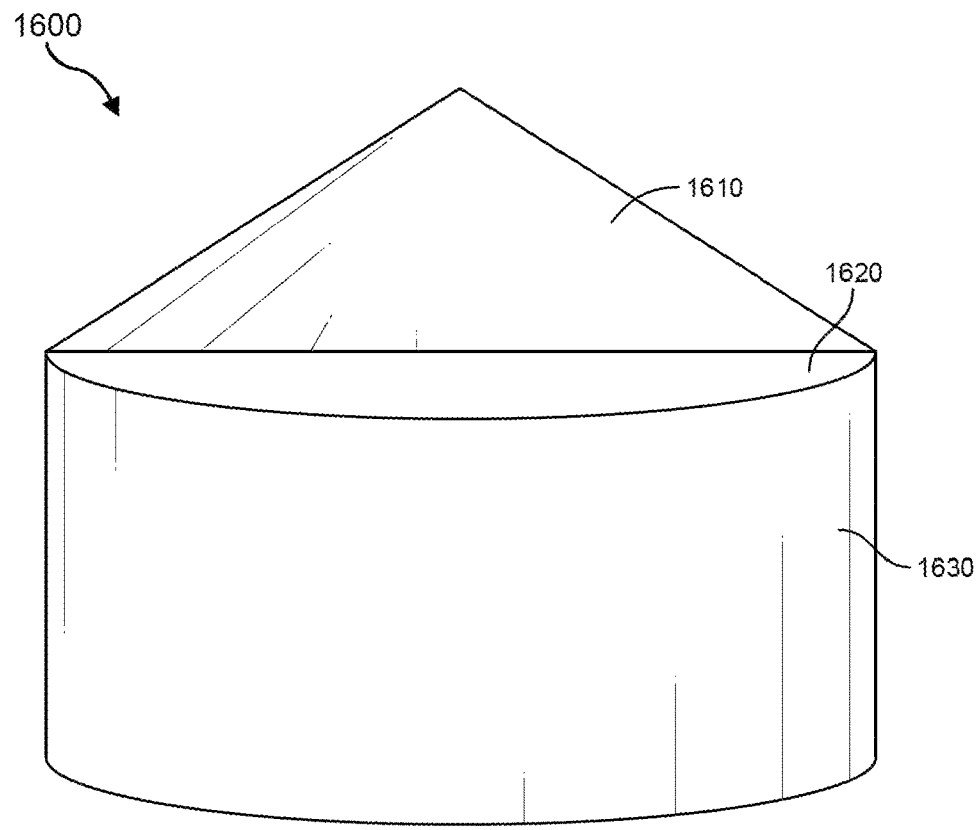
FIG. 16 illustrates an example enclosure for a light source.

FIG. 15A shows a regular arrangement 1550 of apertures 1500 that results in the appearance of moiré patterns when used with a regular array of light sources, and FIG. 155 shows a jittered arrangement 1560 of apertures that reduces or eliminates the appearance of moiré patterns when used with a regular array of light sources. The locations of the apertures are determined by adding random (or quasi-random) variations in location along, for example, two orthogonal directions. The variations in location are allowed to vary randomly within a cell of an array, for example, an area analogous to a unit cell of a repeated pattern. For example, in some cases, a cell is a rectangular cell with a side length equal to the average aperture spacing, and the cells are centered around a regular array of apertures.

FIG. 16 shows an example enclosure for a light source 1600 such as an LED. An enclosure 1630 includes electrical connections to the LED, one or more reflective surfaces 1610, and one or more optical elements 1620 (e.g., for beam shaping) such as lenses. In some examples, an enclosure includes a wedge-shaped element (e.g., a prismatic surface that has reflective coatings on one or more surfaces) and a lens (e.g., a spherical lens, a freeform lens, or a cylindrical lens).

Examples of lighting assemblies are configured to illuminate actors and other objects within a stage environment and to illuminate them from multiple directions. When the light sources are deactivated, the lighting assembly presents a low albedo surface to avoid creating stray light reflections within the stage environment. In some cases, the outer surface of the perforated layer has a matte black surface, for example a textured black surface having topographic features such as ridges, pits, grooves, pillars, depressions and the like that helps reduce specular reflections. An antireflective coating (e.g., a thin dielectric layer) is applied to any appropriate surface.

An arrangement of lighting panels provides improved acoustic properties. In some cases, neighboring lighting panels have appreciably different orientations. For example, the angle between neighboring portions (e.g., lighting panels) is at least 20 degrees and is in the range 20 to 70 degrees, 30 to 60 degrees, or any other suitable range. The arrangement of lighting units provides improved acoustic properties, for example, by not acting as a plane reflector for sound waves that cause acoustic interference effects and perceptible echoes on the stage. Thus, sound recording within the stage is achieved with reduced or substantially eliminated sound echoes from the lighting assembly. Example lighting assemblies are less expensive to fabricate compared with current video walls.

Computing devices and systems described and/or illustrated herein broadly represent any type or form of computing device or system capable of executing computer-readable instructions, such as those contained within the modules described herein. In their most basic configuration, these computing device(s) each include at least one memory device and at least one physical processor. In some examples, a controller for a lighting assembly is or includes one or more computing devices.

In some examples, a system includes a controller including at least one physical processor and physical memory including computer-executable instructions that, when executed by the physical processor, cause the physical processor to modify a light emission profile of at least a portion of a lighting assembly based on camera data, such as camera location data. In some examples, a non-transitory computer-readable medium includes one or more computer-executable instructions that, when executed by at least one processor of a controller, cause the controller to modify a light emission profile of at least a portion of a lighting assembly based on background image data, camera location data, and/or other data. In some examples, the one or more computer-executable instructions, when executed by at least one processor of a controller of a lighting assembly, cause the controller to modify a light emission profile of at least a portion of the lighting assembly based on background image data. In some examples, the controller reduces the brightness and/or resolution of a portion of the lighting assembly that does not illuminate a region of the stage environment that is within the field of view of the camera, and/or increase the brightness and/or resolution of the portion of the lighting assembly that illuminates a region of the stage environment that is within the field of view of the camera.

Advantages of light emission profile adjustments (manual or controller-based) include greater freedom in the creation of the geometry of the lighting assembly. If light from the lighting assembly is more effectively directed towards the camera, lighting efficiency increases, and thermal issues (such as excessive heat generation) are significantly decreased. In some examples, the beam width of light sources is reduced, reducing the angular projection of light. In some examples, each lighting panel is associated with a lever allowing adjustment of the panel orientation, relative to other elements of the lighting assembly. For example, a lighting assembly allowing adjustment of beam directions is fabricated using LEDs having narrower angular light emissions (sometimes termed beam widths).

For example, in some cases, LEDs have an angular width of light emission intensity (full width at half maximum intensity) of less than 100 degrees, such as approximately 90 degrees. In some examples, microlevers are associated for each lighting panel of a lighting assembly, which are electronically or manually controlled. Furthermore, in some configurations, the lighting assembly is configured so that there is no crosstalk between lighting panels shining light on each other. For example, in some cases, beam directions from a portion of a lighting assembly are configured so that they are not directed towards another portion of the lighting assembly, even if the portions are facing each other.

In some examples, a system includes a plurality of cameras. In some examples, a method includes selecting a first camera, using a controller to select first light emission profile adjustments based on a first location of a first camera, selecting a second camera, and using the controller to select second light emission profile adjustments based on a second location of the second camera. The method is extendable to the use of other cameras. In some examples, a plurality of light emission profiles for a lighting assembly are stored in a memory of the controller, and one of the plurality is selected based on an identity and/or location of the camera.

In some cases, light emission profile adjustments, such as beam direction adjustments, are static (e.g., built into the lighting assembly as fabricated), while in other cases, they are dynamic (e.g., electrically or mechanically adjustable adjustments). Example lighting assemblies include both static and dynamic light emission profile adjustments. For example, static adjustments are used to remove visual artifacts that arise from the configuration of lighting panels (e.g., to reduce visual artifacts from edges or corner regions). Static adjustments are also used to improve the acoustic properties of lighting assemblies (e.g., reduction of sound reflections due to extended planar or uniformly curved regions). The mechanical orientation and beam direction (e.g., the principal light projection direction) are decoupled from each other, allowing the mechanical orientations to be varied (e.g., to reduce sound reflections) while maintaining a desired arrangement of beam directions.

In some examples, light loss near corners and interfaces within a lighting assembly are reduced, for example, by modifying the light emission profile near corners or interfaces. In some examples, visual artifacts are reduced or substantially eliminated by modifying light emission properties from lighting panels located near corners of the lighting assembly configurations.

Visual artifacts are eliminated by modifying light emission properties from panels near corners of the lighting assembly configurations. Examples also include lighting assembly geometries that reduces acoustic recording problems, such as lighting assembly portions (that each include one or more lighting panels) with varying (e.g., periodic or random) orientations and compensatory beam direction modifications, such as lighting panels having a modified emission angular profile based on the orientation of the lighting panel.

Example lighting assemblies allow one or more of the following: high-speed response including fast reflectance capture (e.g., OLAT or one light at a time sensors), time-multiplexed matting, performance relighting, and high-dynamic range illumination adjustments. Lighting assemblies simulate a variety of common lighting conditions, including direct sunlight, diffuse sunlight, dawn or dusk light, electric lighting (e.g., incandescent lighting, fluorescent lighting, LED lighting, headlights and the like), moonlight, illumination based on reflection from one or more arbitrary items, or illumination based on burning media (e.g., bonfires, candles, gas lighting, or other lighting based on flammable items), or illumination based on light passing through one or more arbitrary objects.

An example lighting assembly allows one or more of the following benefits: an appropriate stage lighting color balance, visually acceptable reflections from objects within the stage environment, a reduction in the processing burden for the controller (compared to a video wall) and/or visual guidance for actors within the stage environment.

Examples of the present disclosure include a lighting assembly with adjustable light emission properties that allow more light from the lighting assembly to reach the camera. This improves the lighting of the stage environment, and further reduces wasted light, such as light from that lighting assembly that does not reach the camera. The latter aspect reduces the power demands of the lighting assembly and reduces thermal problems such as overheating of the lighting assembly.

Example Embodiments

1. A system, comprising: a support structure, a plurality of light sources mounted to the support structure, wherein the plurality of light sources is configured to project light onto a recording stage to light a specified video scene that is to be recorded on the recording stage, and a perforated layer comprising an arrangement of apertures, wherein the perforated layer has an inward face directed toward the plurality of lighting sources and an outward face directed toward the recording stage, and wherein the inward face of the perforated layer includes a surface layer that is more reflective than a surface layer of the outward face of the perforated layer.

2. The system of claim 1, further comprising a diffusing layer positioned between the plurality of light sources and the perforated layer.

3. The system of claim 2, wherein the diffusing layer reflects at least a portion of projected light that is reflected from the inward face of the perforated layer.

4. The system of claim 1, wherein: an inner reflectance of the inward face of the perforated layer is at least 70% for at least one wavelength of the projected light, and an outer reflectance of the outward face of the perforated layer is less than 20% for the at least one wavelength of projected light.

5. The system of claim 4, wherein: the outer reflectance is less than 10% for the at least one wavelength of projected light.

6. The system of claim 4, wherein the inner reflectance is greater than 85% for the at least one wavelength of projected light.

7. The system of claim 1, wherein the perforated layer includes a polymer layer supporting an inner metal coating, and wherein the inner metal coating provides an inner reflectance of the inward face of the perforated layer.

8. The system of claim 1, wherein the arrangement of apertures includes a uniform grid of apertures.

9. The system of claim 1, wherein the arrangement of apertures includes a randomly spaced arrangement of apertures.

10. The system of claim 1, wherein the plurality of light sources comprises an array of controllable light-emitting diodes (LEDs).

11. The system of claim 10, wherein the array of controllable LEDs has a center-to-center spacing of at least 10 mm between LEDs along at least one direction.

12. The system of claim 1, further comprising a controller configured to: receive background image data, and adjust a light emission profile of at least one light source of the plurality of light sources based on the background image data.

13. The system of claim 12, wherein the controller is configured to adjust a color balance of the at least one light source of the plurality of light sources based on the background image data.

14. The system of claim 12, wherein the controller is configured to adjust a brightness of the at least one light source of the plurality of light sources based on the background image data.

15. An apparatus comprising: a support structure, a plurality of light sources mounted to the support structure, wherein the plurality of light sources is configured to project light onto a recording stage to light a specified video scene that is to be recorded on the recording stage, and a perforated layer comprising an arrangement of apertures, wherein the perforated layer has an inward face directed toward the plurality of lighting sources and an outward face directed toward the recording stage, and wherein the inward face of the perforated layer includes a surface layer that is more reflective than a surface layer of the outward face of the perforated layer.

16. The apparatus of claim 15, wherein the apertures in the arrangement of apertures account for 15% or less of the surface area of the perforated layer.

17. The apparatus of claim 15, wherein the surface layer of the inward face of the perforated layer has a mirror finish.

18. The apparatus of claim 15, further comprising: a diffusing layer positioned between the plurality of light sources and the perforated layer, and a controller configured to modify a light emission profile of at least one light source of the plurality of light sources.

19. The apparatus of claim 18, wherein modifying the light emission profile of at least one light source of the plurality of light sources includes modifying at least one of a color, brightness, color balance, or time dependence of the projected light.

20. A recording stage lighting device, comprising: a support structure, a plurality of light sources mounted to the support structure, wherein the plurality of light sources is configured to project light onto a recording stage to light a specified video scene that is to be recorded on the recording stage, and a perforated layer comprising an arrangement of apertures, wherein the perforated layer has an inward face directed toward the plurality of lighting sources and an outward face directed toward the recording stage, and wherein the inward face of the perforated layer includes a surface layer that is more reflective than a surface layer of the outward face of the perforated layer.

In some examples, the term "memory device" generally refers to any type or form of volatile or non-volatile storage device or medium capable of storing data and/or computer-readable instructions. In one example, a memory device stores, loads, and/or maintains one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor accesses and/or modifies one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules or components described and/or illustrated herein represent portions of a single module or application. In addition, in certain embodiments one or more of these modules represents one or more software applications or programs that, when executed by a computing device, cause the computing device to perform one or more tasks. For example, one or more of the modules described and/or illustrated herein represents modules stored and configured to run on one or more of the computing devices or systems described and/or illustrated herein. One or more of these modules also represents all or portions of one or more special-purpose computers configured to perform one or more tasks.

In addition, one or more of the modules described herein transform data, physical devices, and/or representations of physical devices from one form to another. For example, one or more of the modules recited herein receives background image data to be analyzed and/or transformed, transform the background image data into an adjustment of a light emission profile of a portion the lighting assembly, and output a result of the transformation as, for example, an actuator control signal or other electrical signal to modify a light emission profile of the portion of the lighting assembly. For example, the results of the transformation are used to energize an actuator, and/or to control an electrooptical device. Additionally or alternatively, one or more of the modules recited herein transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference is made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

Features from any of the embodiments described herein are used in combination with one another in accordance with the general principles described herein. These and other embodiments, features, and advantages will be more fully understood upon reading the following detailed description in conjunction with the accompanying drawings and claims.

What is claimed is:

1. A system, comprising:
   a support structure;
   a plurality of light sources mounted to the support structure, wherein the plurality of light sources is configured to project light onto a recording stage to light a specified video scene that is to be recorded by plurality of cameras on the recording stage;
   one or more actuators connected to at least one of the plurality of light sources;
   at least one electronic controller communicatively connected to at least one of the plurality of light sources, wherein the electronic controller is configured to automatically adjust a light emission profile of the at least one light source based on which of the plurality of cameras is currently active, and wherein the electronic controller is configured to further cause at least one of the actuators to dynamically reorient at least one of the light sources based on which of the plurality of cameras is currently active; and
   a perforated layer comprising an arrangement of apertures,
      wherein the perforated layer has an inward face directed toward the plurality of lighting sources and an outward face directed toward the recording stage; and
      wherein the inward face of the perforated layer includes a surface layer that is more reflective than a surface layer of the outward face of the perforated layer.

2. The system of claim 1, further comprising a diffusing layer positioned between the plurality of light sources and the perforated layer.

3. The system of claim 2, wherein the diffusing layer reflects at least a portion of projected light that is reflected from the inward face of the perforated layer.

4. The system of claim 1, wherein:
   an inner reflectance of the inward face of the perforated layer is at least 70% for at least one wavelength of the projected light; and
   an outer reflectance of the outward face of the perforated layer is less than 20% for the at least one wavelength of projected light.

5. The system of claim 4, wherein:
   the outer reflectance is less than 10% for at least one wavelength of projected light.

6. The system of claim 4, wherein the inner reflectance is greater than 85% for the at least one wavelength of projected light.

7. The system of claim 1, wherein the perforated layer includes a polymer layer supporting an inner metal coating, and wherein the inner metal coating provides an inner reflectance of the inward face of the perforated layer.

8. The system of claim 1, wherein the arrangement of apertures includes a uniform grid of apertures.

9. The system of claim 1, wherein the arrangement of apertures includes a randomly spaced arrangement of apertures.

10. The system of claim 1, wherein the plurality of light sources comprises an array of controllable light-emitting diodes (LEDs).

11. The system of claim 10, wherein the array of controllable LEDs has a center-to-center spacing of at least 10 mm between LEDs along at least one direction.

12. The system of claim 1, further comprising a controller configured to:
   receive background image data associated with a background image that is to be displayed on the recording stage; and
   adjust a light emission profile of at least one light source of the plurality of light sources based on the background image data.

13. The system of claim 12, wherein the controller is configured to adjust a color balance of the at least one light source of the plurality of light sources based on the background image data.

14. The system of claim 12, wherein the controller is configured to adjust a brightness of at least one light source of the plurality of light sources based on the background image data.

15. An apparatus comprising:
   a support structure;
   a plurality of light sources mounted to the support structure, wherein the plurality of light sources is configured to project light onto a recording stage to light a specified video scene that is to be recorded by a plurality of cameras on the recording stage;
   one or more actuators connected to at least one of the plurality of light sources;
   at least one electronic controller communicatively connected to at least one of the plurality of light sources, wherein the electronic controller is configured to automatically adjust a light emission profile of the at least one light source based on which of the plurality of cameras is currently active, and wherein the electronic controller is configured to further cause at least one of the actuators to dynamically reorient at least one of the light sources based on which of the plurality of cameras is currently active; and
   a perforated layer comprising an arrangement of apertures, wherein the perforated layer has an inward face directed toward the plurality of lighting sources and an outward face directed toward the recording stage; and wherein the inward face of the perforated layer includes a reflective surface layer.

16. The apparatus of claim 15, wherein the apertures in the arrangement of apertures account for 15% or less of the surface area of the perforated layer.

17. The apparatus of claim 15, wherein the surface layer of the inward face of the perforated layer has at least one of a mirror finish, a diffuse white finish, or a high-gain finish.

18. The apparatus of claim 15, further comprising:
a diffusing layer positioned between the plurality of light sources and the perforated layer; and
a controller configured to modify a light emission profile of at least one light source of the plurality of light sources.

19. The apparatus of claim 18, wherein modifying the light emission profile of at least one light source of the plurality of light sources includes modifying a color, brightness, color balance, or time dependence of the projected light.

20. A recording stage lighting device, comprising:
a support structure;
a plurality of light sources mounted to the support structure, wherein the plurality of light sources is configured to project light onto a recording stage to light a specified video scene that is to be recorded by a plurality of cameras on the recording stage;
one or more actuators connected to at least one of the plurality of light sources;
at least one electronic controller communicatively connected to at least one of the plurality of light sources, wherein the electronic controller is configured to automatically adjust a light emission profile of the at least one light source based on which of the plurality of cameras is currently active, and wherein the electronic controller is configured to further cause at least one of the actuators to dynamically reorient at least one of the light sources based on which of the plurality of cameras is currently active; and
a perforated layer comprising an arrangement of apertures, wherein the perforated layer has an inward face directed toward the plurality of lighting sources and an outward face directed toward the recording stage.

* * * * *